(12) United States Patent
Iwahori et al.

(10) Patent No.: US 12,467,828 B2
(45) Date of Patent: Nov. 11, 2025

(54) INSPECTION METHOD FOR MOVING OBJECT

(71) Applicant: TOYOTA JIDOSHA KABUSHIKI KAISHA, Toyota (JP)

(72) Inventors: Kento Iwahori, Nagoya (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 83 days.

(21) Appl. No.: 18/652,995

(22) Filed: May 2, 2024

(65) Prior Publication Data

US 2024/0393212 A1 Nov. 28, 2024

(30) Foreign Application Priority Data

May 25, 2023 (JP) .................................. 2023-085849

(51) Int. Cl.
*G01M 17/007* (2006.01)
*G07C 5/00* (2006.01)

(52) U.S. Cl.
CPC .......... *G01M 17/0072* (2013.01); *G07C 5/006* (2013.01); *G07C 5/008* (2013.01)

(58) Field of Classification Search
CPC ... G01M 17/0072; G07C 5/006; G07C 5/008; G01P 21/02; G05D 1/43; G05D 1/242; G05D 1/243; G05D 1/644; G05D 1/648
See application file for complete search history.

(56) References Cited

U.S. PATENT DOCUMENTS

| | | | |
|---|---|---|---|
| 2008/0071899 A1* | 3/2008 | Odaka | H04L 43/12 709/223 |
| 2010/0198955 A1* | 8/2010 | Maruyama | G06F 8/65 709/224 |
| 2014/0286372 A1* | 9/2014 | Kobayashi | G01K 1/026 374/1 |
| 2019/0306177 A1* | 10/2019 | Kobayashi | H04L 63/14 |
| 2020/0025652 A1* | 1/2020 | Yoshida | G06F 13/00 |
| 2021/0174276 A1* | 6/2021 | Satoh | G06F 16/9035 |
| 2024/0393211 A1* | 11/2024 | Iwahori | G01M 99/008 |
| 2024/0393212 A1* | 11/2024 | Iwahori | G01M 17/0072 |
| 2024/0393256 A1* | 11/2024 | Iwahori | G01M 17/08 |
| 2024/0393362 A1* | 11/2024 | Iwahori | G01C 21/12 |

FOREIGN PATENT DOCUMENTS

JP 2020-060459 A 4/2020

* cited by examiner

*Primary Examiner* — Bhavesh V Amin
(74) *Attorney, Agent, or Firm* — Oliff PLC

(57) ABSTRACT

An inspection method for a moving object that can move by unmanned driving includes: a first step of giving an instruction to drive from a server to a moving object of an inspection target wherein an output value related to movement of the moving object is a predetermined target value; a second step of measuring the output value using an inspection device that inspects the moving object, and acquiring a measurement value; a maintenance information acquiring step of acquiring maintenance information related to a history of maintenance executed with respect to at least one target device of the server and the inspection device; and an abnormality specifying step of, when a difference between the target value and the measurement value is not within a predetermined reference range, specifying which one of the server, inspection device, and moving object of the inspection target has an abnormality using the maintenance information.

10 Claims, 12 Drawing Sheets

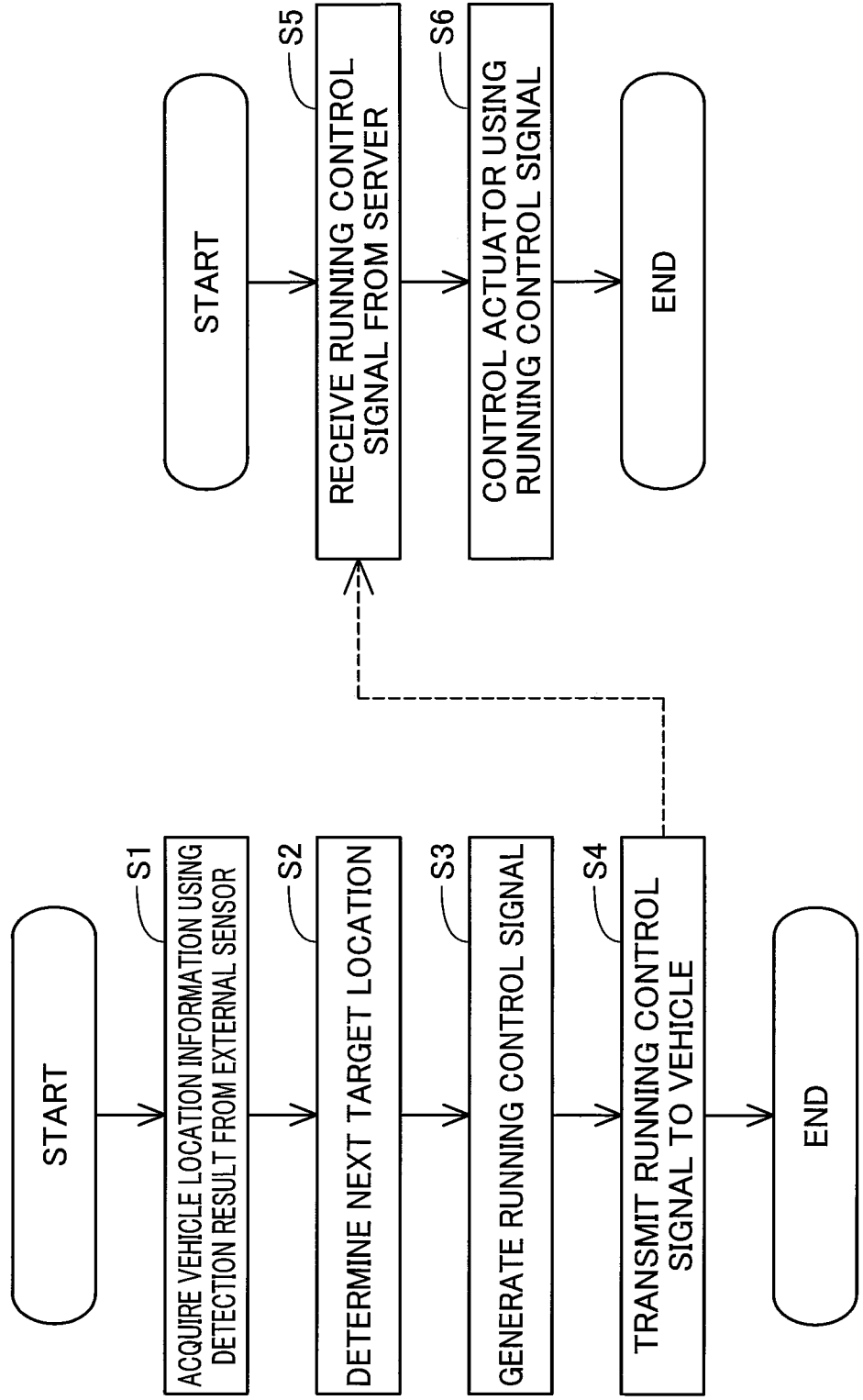

INSPECTION METHOD FOR MOVING OBJECT

CROSS REFERENCE TO RELATED APPLICATIONS

This application is based upon and claims benefit of priority from Japanese Patent Application No. 2023-085849, filed on May 25, 2023, the entire contents of which are incorporated herein by reference.

BACKGROUND

Field

The present disclosure relates to an inspection method for a moving object.

Related Art

For example, JP 2020-60459 A discloses an inspection system in which a worker runs a vehicle on roller devices, and inspects an abnormality of a speedometer of the vehicle using a sensor vehicle speed acquired by a vehicle speed sensor of the vehicle, and roller vehicle speeds acquired by the roller devices. This inspection system determines the abnormality of the speedometer of the vehicle when the roller vehicle speeds are not within a predetermined reference range.

SUMMARY

However, even when an abnormality is detected using an inspection device, the abnormality is not necessarily an abnormality of the vehicle, and is also likely to be, for example, an abnormality of the inspection device. Furthermore, when inspection is performed in a state where the vehicle is run by remote control, an abnormality is also likely to be an abnormality of a server that executes remote control. A conventional technique has a problem that, when an abnormality occurs, it is not possible to specify which one of the vehicle, the inspection device, and the server a cause of the abnormality is.

The present disclosure can be implemented as a following aspect.

(1) One aspect of the present disclosure provides an inspection method for a moving object that can move by unmanned driving. This inspection method includes: a first step of giving an instruction to perform driving from a server to a moving object of an inspection target such that an output value related to movement of the moving object is a predetermined target value; a second step of measuring the output value using an inspection device that inspects the moving object, and acquiring a measurement value; a maintenance information acquiring step of acquiring maintenance information related to a history of maintenance executed with respect to at least one target device of the server and the inspection device; and an abnormality specifying step of, when a difference between the target value and the measurement value is not within a predetermined reference range, specifying which one of the server, the inspection device, and the moving object of the inspection target has an abnormality using the maintenance information.

According to the inspection method according to this aspect, at a time of inspection that uses a remote control device and the inspection device in the moving object that can move by unmanned driving, it is possible to highly reliably specify a cause of the abnormality by determining which one of the inspection target moving object, the inspection device, and the remote control device has the abnormality.

(2) According to the inspection method according to the above aspect, the maintenance information may be information related to an execution timing at which the maintenance has been executed with respect to the target device.

According to the inspection method according to this aspect, it is possible to highly reliably specify the cause of the abnormality by a simple method that uses the execution timing of the maintenance.

(3) According to the inspection method according to the above aspect, in the abnormality specifying step, when a timing at which the second step is executed is within a predetermined period from the execution timing included in the maintenance information, it may be determined that the target device for which the maintenance has been executed has no abnormality.

According to the inspection method according to this aspect, it is possible to simplify the abnormality specifying step according to the maintenance information within the predetermined period from the execution timing of the maintenance.

(4) The inspection method according the above aspect may further include a training step of training a machine learning model using past data related to input/output of the server, past data related to input/output of the inspection device, past data related to the maintenance information, and past data related to whether the server, the inspection device, and the moving object of the inspection target are normal or abnormal, in the abnormality specifying step, which one of the server, the inspection device, and the moving object of the inspection target has the abnormality may be specified using the machine learning model trained in the training step.

According to the inspection method according to this aspect, it is possible to improve inspection productivity and accuracy of specifying the cause of the abnormality using the machine learning model trained using the past data.

(5) According to the inspection method according to the above aspect, in the abnormality specifying step, when the second step is executed within a predetermined period from an execution timing at which the maintenance has been executed with respect to the target device, information may be output that indicates that a probability that the target device for which the maintenance has been executed has no abnormality is higher than a probability in a case where the maintenance is not executed.

(6) According to the inspection method according to the above aspect, the maintenance information may be information related to whether or not the abnormality of the target device has been detected at a time of the maintenance.

According to the inspection method according to this aspect, it is possible to highly reliably specify the cause of the abnormality by a simple method that uses whether or not there is the abnormality at the time of the maintenance.

(7) According to the inspection method according to the above aspect, in the abnormality specifying step, when the maintenance information includes information indicating that the abnormality of the target device has been detected at the time of the maintenance, it may be determined that the target device from which the abnormality has been detected has the abnormality.

According to the inspection method according to this aspect, it is possible to simplify the abnormality specifying step by a simple method for checking whether or not there is the abnormality at the time of the maintenance.

(8) According to the inspection method according to the above aspect, the abnormality specifying step may execute a specifying step of, when the maintenance information includes information indicating that the abnormality of the target device has been detected at the time of the maintenance, and further includes information indicating that a member that has caused the abnormality of the target device from which the abnormality has been detected has been exchanged, determining that the target device from which the abnormality has been detected has no abnormality, or specifying whether or not the target device from which the abnormality has been detected has the abnormality.

According to the inspection method according to this aspect, it is possible to appropriately specify the cause of the abnormality taking into account a case where the abnormality at the time of maintenance is repaired.

(9) According to the inspection method according to the above aspect, the maintenance information may be information related to whether or not the abnormality of the target device has been continuously or intermittently detected at a time of the maintenance.

According to the inspection method according to this aspect, it is possible to highly reliably specify the cause of the abnormality by a simple method for checking whether or not there is a continuous or intermittent abnormality at the time of the maintenance.

(10) According to the inspection method according to the above aspect, in the abnormality specifying step, when the maintenance information includes information indicating that the abnormality of the target device has been continuously or intermittently detected at a time of the maintenance, information may be output that indicates that the target device from which the continuous or intermittent abnormality has been detected has the abnormality.

According to the inspection method according to this aspect, it is possible to simplify the abnormality specifying step by a simple method for checking whether or not there is the continuous or intermittent abnormality at the time of the maintenance.

The present disclosure can be also implemented by various aspects other than the inspection method. For example, the present disclosure can be implemented by, for example, aspects such as a moving object inspection system, an inspection device, a moving object manufacturing method, an inspection system control method, an inspection device control method, a computer program for implementing these control methods, and a non-transitory recording medium having this computer program recorded thereon.

BRIEF DESCRIPTION OF DRAWINGS

FIG. 4A is a flowchart illustrating a processing procedure of running control of a vehicle according to the first embodiment;

DESCRIPTION OF EMBODIMENTS

A. First Embodiment

Figure 1:
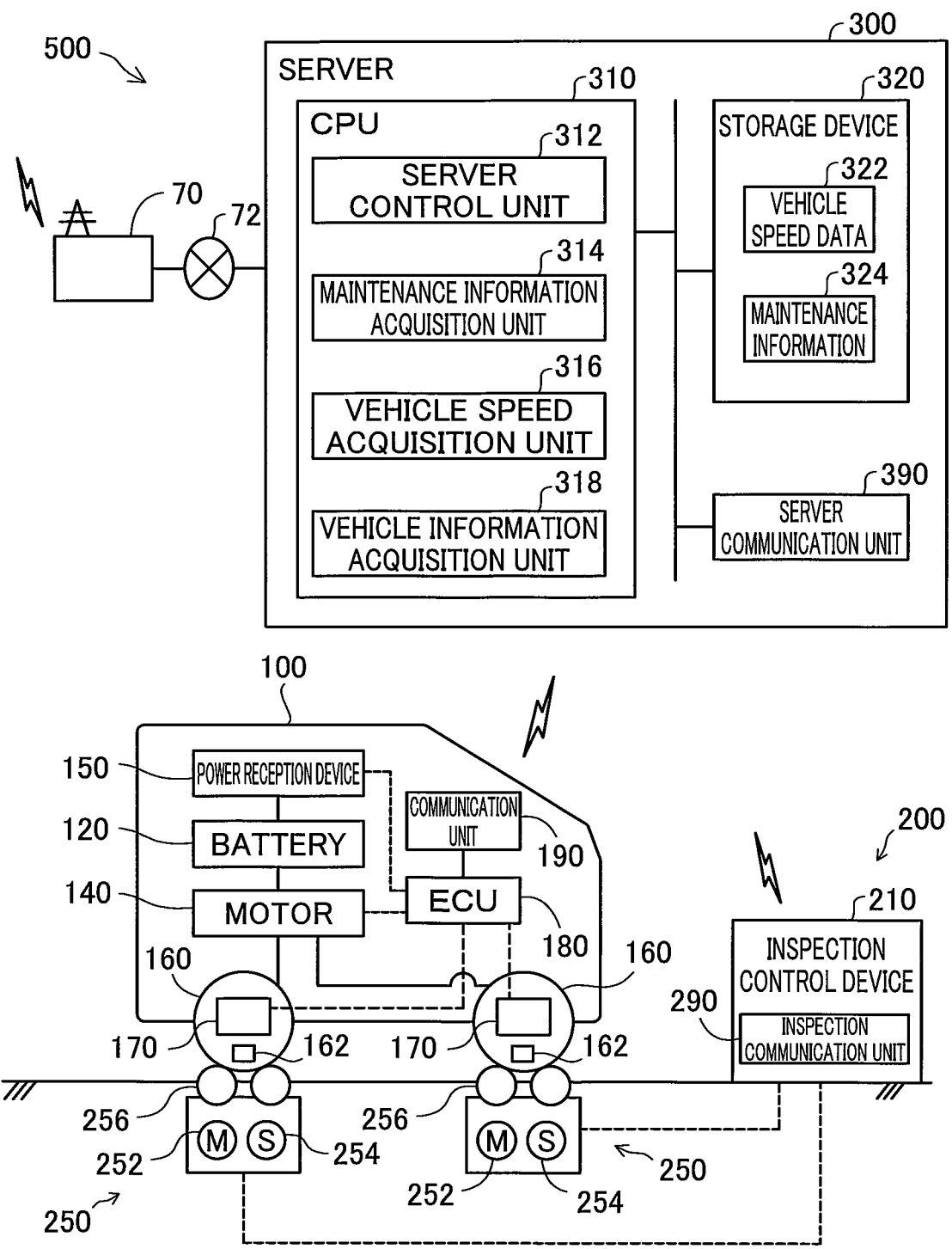
FIG. 1 is an explanatory view illustrating a schematic configuration of an inspection system according to a first embodiment of the present disclosure.

FIG. 1 is an explanatory view illustrating a schematic configuration of an inspection system 500 according to the first embodiment of the present disclosure. The inspection system 500 is used in, for example, a factory that manufactures vehicles 100 that are moving objects that can be run by unmanned driving. The inspection system 500 includes an inspection device 200 and a server 300 that is a remote control device. The inspection system 500 inspects whether or not the vehicle 100 can be normally run at a predetermined running speed by unmanned driving.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

The vehicle 100 is configured to be capable of running by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving."

In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

The vehicle 100 is, for example, a passenger car, a truck, a bus, and a construction vehicle. The vehicle 100 is preferably a Battery Electric Vehicle (BEV). Note that the vehicle 100 is not limited to an electric vehicle, and may be, for example, a gasoline car, a hybrid car, or a fuel cell car. The vehicle 100 includes a vehicle communication unit 190, a power reception device 150, a motor 140, a battery 120, a wheel speed sensor 170, and an Electronic Control Unit (ECU) 180.

The vehicle communication unit 190 wirelessly communicates with a device such as the inspection device 200 or the server 300 outside the vehicle 100 connected to a network 72 via an access point 70 in the factory. The vehicle communication unit 190 transmits output values such as a running speed of the vehicle 100, a braking force of a brake, a rotational speed of wheels 160, and a State of Charge (SOC) of the battery 120 associated with inspection items of the inspection device 200 to the server 300 or the inspection device 200.

The power reception device 150 includes, for example, an unillustrated power reception circuit and power receiver. The power receiver is, for example, a power feeding inlet meeting a power feeding connector of a charging device. The power reception device 150 may include a power reception resonance circuit that receives electric power supplied from the charging device via a power feeding resonance circuit by non-contact power supply that uses the electromagnetic induction phenomenon. The power reception circuit is a rectifier, a DC/DC converter, or the like. When receiving supply of alternating current power from the power receiver, the power reception circuit converts the supplied alternating-current power into a direct current power by the rectifier. The converted direct current power is supplied to the battery 120 via the DC/DC converter.

The motor 140 is, for example, an alternating current synchronization motor, and functions as an electric motor and an electric generator. When the motor 140 functions as the electric motor, the motor 140 is driven using electric power stored in the battery 120 as a power source. An output of the motor 140 is transmitted to the wheels 160 via a decelerator and an axle. At a time of deceleration of the vehicle 100, the motor 140 functions as the electric generator that uses rotation of the wheels 160, and generates regenerative power.

Rotation of the wheels 160 is one form of a "moving operation" that is an operation of a moving object to move. The wheel 160 is one form of a "moving unit" that is part of the moving object that performs the moving operation. A brake 162 that stops rotation of the wheel 160 is one form of a "stop unit" that is provided to the moving object, and stops the moving operation of the moving object.

The battery 120 is, for example, a chargeable secondary battery such as a lithium ion battery and a nickel-metal hydride battery. The battery 120 stores electric power or the like used by the vehicle 100 to run. When the electric power supplied from the charging device to the power reception device 150 and regenerative power generated by the motor 140 are supplied to the battery 120, the battery 120 is charged, and the state of charge of the battery 120 increases. A Power Control Unit (PCU) that includes an inverter, a boost converter, and a DC/DC converter may be connected between the battery 120 and the motor 140.

The wheel speed sensor 170 detects the rotation speed of each wheel 160. The wheel speed sensor 170 calculates the running speed of the vehicle 100 using the detected rotation speed of each wheel 160. More specifically, the wheel speed sensor 170 performs arithmetic processing of, for example, averaging the rotation speed of each wheel 160, and then calculates the running speed of the vehicle 100 using the rotation speed per unit time. Note that at least part of the functions of calculating the running speed of the vehicle 100 may be executed by a vehicle speed acquisition unit 316 of the server 300 or the ECU 180 that has acquired the rotation speed of the wheel 160 from the wheel speed sensor 170.

A device that is provided to the moving object and detects output values related to movement of the moving object is also referred to as a "moving object detection unit". The "output values related to movement of the moving object" may include a moving speed of the moving object, and various output values that can derive the moving speed of the moving object. The output values detected by the moving object detection unit are also referred to as "moving object side output values".

A device that is provided to the vehicle 100 and detects output values related to running of the vehicle 100 is also referred to as a "vehicle detection unit". The wheel speed sensor 170 is one form of the "vehicle detection unit". The "output values related to running of the vehicle 100" may include the running speed of the vehicle 100 and the various output values such as the rotational speed of the wheels 160, the rotation speed of the wheels 160, and the torque of the wheels 160 that can derive the running speed of the vehicle 100. The running speed of the vehicle 100 detected by the vehicle detection unit is also referred to as a "vehicle side speed".

Figure 2:
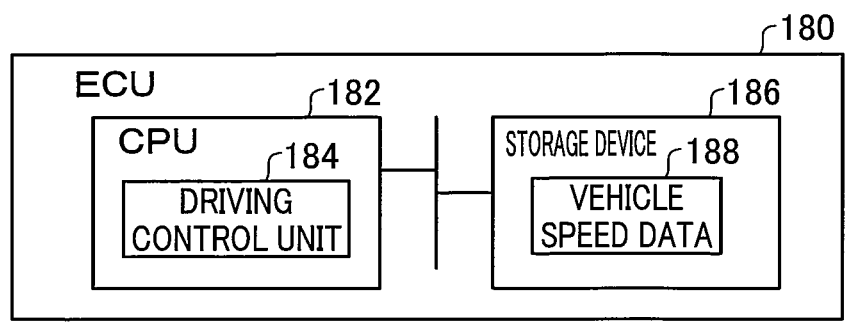
FIG. 2 is a block diagram illustrating an internal functional configuration of an ECU.

FIG. 2 is a block diagram illustrating an internal functional configuration of the ECU 180. The ECU 180 is mounted on the vehicle 100, and executes various control of the vehicle 100. The ECU 180 includes a Hard Disk Drive (HDD), a Solid State Drive (SSD), a storage device 186 such as an optical recording medium or a semiconductor memory, a CPU 182 that is a central processing unit, and the like. In a readable/writable region of the storage device 186, vehicle speed data 188 is stored. The vehicle speed data 188 is a vehicle side speed obtained from the wheel speed sensor 170. Computer programs for implementing at least part of functions provided in the present embodiment are stored in the storage device 186. When the CPU 182 executes various computer programs stored in the memory, functions of a driving control unit 184 and the like are implemented.

The driving control unit 184 executes driving control of the vehicle 100. "Driving control" is, for example, various control such as adjustment of an acceleration, a speed, and a rudder angle for driving each actuator that exhibits the functions of "run", "turn", and "stop" of the vehicle 100. According to driving control of the vehicle 100 by remote control, the driving control unit 184 controls each actuator mounted on the vehicle 100 according to a request of the remote control received from the server 300 via the vehicle communication unit 190.

In the present embodiment, the actuators include an actuator of a driving device that accelerates the vehicle 100, an actuator of a steering device that changes a traveling direction of the vehicle 100, and an actuator of a braking device that decelerates the vehicle 100. The driving device includes the battery 120, the motor 140, and the wheels 160. The actuator of the driving device includes the motor 140. Note that the actuators may further include an actuator that causes wipers of the vehicle 100 to swing, and an actuator that opens and closes a power window of the vehicle 100.

The driving control unit 184 can cause the vehicle 100 to run by controlling the actuators according to a driver's operation when the driver is in the vehicle 100. The driving control unit 184 can cause the vehicle 100 to run by controlling the actuators in response to a control command transmitted from the server 300 irrespectively of whether or not the driver is in the vehicle 100.

Back to FIG. 1, the server 300 executes driving control of the vehicle 100 by remote control. The server 300 conveys the vehicle 100 in a manufacturing process in the factory by, for example, causing the vehicle 100 to autonomously run. Conveyance of the vehicle 100 that uses autonomous running by remote control is also referred to as "self-running conveyance". The server 300 can cause the vehicle 100 to move by remote control without using a conveyance device such as a crane or a conveyor. The server 300 causes the vehicle 100 to autonomously run in response to a request from the inspection device 200 at a time at which the inspection device 200 inspects the vehicle 100.

The server 300 includes a CPU 310 that is a central processing unit, a storage device 320, and a server communication unit 390. These units are connected with each other via an internal bus, an interface circuit, or the like. The server communication unit 390 communicates with the vehicle 100, the inspection device 200, and the like via the network 72.

The storage device 320 is, for example, a RAM, a ROM, an HDD, and an SSD. The storage device 320 stores vehicle speed data 322 and maintenance information 324 as described later. Furthermore, when a computer program stored in the storage device 320 is executed by the CPU 310, the CPU 310 functions as a server control unit 312, the vehicle speed acquisition unit 316, and a vehicle information acquisition unit 318. In this regard, part or all of these functions may be configured by hardware circuits.

The vehicle information acquisition unit 318 acquires vehicle identification information of the vehicle 100 from a step management device or the like provided to each step. The "vehicle identification information" means various pieces of information that make it possible to individually identify the vehicle 100. The vehicle identification information is, for example, ID information such as a Vehicle Identification Number (VIN) given per vehicle 100, and a manufacturing number used for production management. The vehicle identification information may further include specification information of the vehicle 100 such as the vehicle type, the color, and the shape. The vehicle identification information is not limited to the information for identifying the single vehicle 100, and, for example, information such as a lot number for identifying a plurality of the vehicles 100 in a predetermined unit may be used. The vehicle identification information can be acquired from, for example, a Radio Frequency-Identification (RF-ID) tag attached to the vehicle 100 via short range wireless communication or the like. The vehicle identification information may be acquired by reading a two-dimensional code attached to the vehicle 100 or the like using a camera.

The vehicle speed acquisition unit 316 acquires the running speed, that is, the vehicle side speed of the vehicle 100 detected by the vehicle 100. In the present embodiment, the vehicle speed acquisition unit 316 acquires the vehicle speed data 188 owned by the vehicle 100 via the server communication unit 390. The vehicle speed acquisition unit 316 may acquire the rotation speed of each wheel 160 from the wheel speed sensor 170, and calculate the running speed of the vehicle 100. The acquired vehicle side speed is stored as the vehicle speed data 322 associated with the vehicle identification information in the storage device 320.

A maintenance information acquisition unit 314 acquires the maintenance information 324 related to maintenance executed with respect to the server 300. The "maintenance information" means various pieces of information related to a history of maintenance of a device whose object is to, for example, prepare, keep, maintain, and inspect the device. For example, maintenance of the device preferably does not include light contents that do not influence the functions of the device, and are contents that make it possible to sufficiently estimate that a target device can normally operate or contents that make it possible to sufficiently estimate that a target device has an abnormality. The maintenance information is used for the inspection method according to the present embodiment.

The "history of maintenance" may include, for example, information related to a maintenance result such as information on whether or not an abnormality has been detected at a time of maintenance or information on portions and members that are, for example, repaired or exchanged at the time of maintenance. Furthermore, the "history of maintenance" may include, for example, information related to a maintenance history or temporal information on maintenance such as an execution timing at which maintenance has been executed. The maintenance information acquisition unit 314 acquires as maintenance information 324 information related to maintenance and manually input by a worker or the like who has maintained the server 300. The maintenance information acquisition unit 314 may acquire the maintenance information 324 from a management device or the like that integrally manages the maintenance information or the like of the server 300 and the inspection device 200. The acquired maintenance information 324 is stored in the storage device 320.

The server control unit 312 transmits a control signal for requesting remote control of the vehicle 100 to the vehicle 100 via the server communication unit 390. When the vehicle 100 receives the request for remote control, the ECU 180 implements driving control, and, as a result, the vehicle 100 automatically runs.

The server control unit 312 acquires vehicle information from a vehicle detector that is an external sensor disposed on a track in the factory at a time of self-running conveyance. The "vehicle information" means information that includes at least one of images of the vehicle 100 and position information of the vehicle 100. For the vehicle detector, for example, cameras can be used. The cameras are communicably connected with the server 300 by wireless communication or wired communication. The cameras are fixed to positions at which the cameras can image the vehicle 100 running on the track in the factory, and acquires images of the vehicle 100 as the vehicle information. Note that the vehicle detector may acquire the position of the vehicle 100 instead of or together with the images of the vehicle 100.

When the vehicle detector acquires the position of the vehicle 100, various detectors such as a LIDAR, an infrared sensor, a laser sensor, an ultrasonic sensor, and a millimeter wave radar that can detect the position of the vehicle 100 can be used as the vehicle detector. Furthermore, the "vehicle information" may further include the running direction of the vehicle 100 or a direction of the vehicle 100. The running direction of the vehicle 100 or the direction of the vehicle 100 can be acquired by detecting, for example, the shape of the vehicle 100, a part of the vehicle 100, or the like. In this regard, the vehicle detector may acquire only the position of the vehicle 100 and use a temporal change of the vehicle 100 to estimate the running direction or the direction of the vehicle 100.

The server control unit 312 creates a control value of each actuator or the like while analyzing the acquired vehicle information, and causes the ECU 180 to execute driving control of the vehicle 100 using the created control value or the like. For example, the server control unit 312 causes the vehicle 100 to run along a target route by analyzing the vehicle information, and adjusting the relative position of the vehicle 100 with respect to the target route set in advance to the track.

The inspection device 200 inspects whether or not the vehicle 100 can be normally run by remote control using the running speed detected by a device such as the inspection device 200 outside the vehicle 100. The running speed of the vehicle 100 detected by the inspection device 200 is also referred to as an "inspection side speed" or simply as a "measurement value". A device that is provided to the inspection device 200 and detects an output related to running of the vehicle 100 is also referred to as an "inspection detection unit". Furthermore, when determining that an inspection result indicates an abnormality, the inspection device 200 specifies which one of the vehicle 100, the server 300, and the inspection device 200 has the abnormality.

The inspection device 200 includes roller devices 250, an inspection control device 210, and an inspection communication unit 290. The inspection communication unit 290 communicates with the server 300, the vehicle 100, or the like via the network 72.

The roller device 250 acquires the running speed of the vehicle 100 that is one form of the "output value related to running of the vehicle 100". The roller device 250 includes a roller 256, a motor 252, and a speed sensor 254. As illustrated in FIG. 1, when the vehicle 100 is disposed at a position at which the inspection device 200 can inspect the vehicle 100, the roller 256 comes into contact with the circumferential surface of the wheel 160 of the vehicle 100. In this state, the roller 256 rotates as the wheel 160 rotates.

The motor 252 can rotate the roller 256 at a predetermined torque or rotation speed. When a rotation direction of the wheel 160 at a time when the vehicle 100 moves forward is a forward rotation direction, and the rotation direction at a time when the vehicle 100 moves backward is a backward rotation direction, the motor 252 can rotate the wheel 160 in any one direction of the forward rotation direction and the backward rotation direction by switching the rotation direction of the roller 256.

The speed sensor 254 is a sensor that detects the rotation speed of the roller 256. As the speed sensor 254, for example, a rotary encoder or the like can be used. The speed sensor 254 calculates the running speed of the vehicle 100 using the detected rotation speed of the roller 256. The running speed of the vehicle 100 may be calculated by the inspection control device 210 that has acquired the rotation speed of the roller 256 from the speed sensor 254. The speed sensor 254 is one form of the "inspection detection unit".

Figure 3:
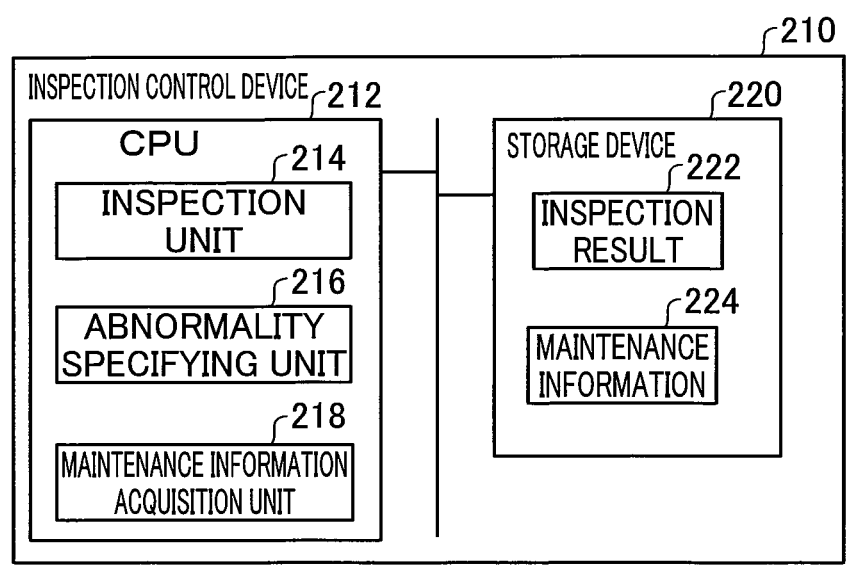
FIG. 3 is a block diagram illustrating an internal functional configuration of an inspection control device.

FIG. 3 is a block diagram illustrating an internal functional configuration of the inspection control device 210. The inspection control device 210 includes a CPU 212 that is a central processing unit, and the storage device 220. These units are connected with each other via an internal bus, an interface circuit, or the like.

The storage device 220 is, for example, a RAM, a ROM, a Hard Disk Drive (HDD), a Solid State Drive (SSD), and the like. When a computer program stored in the storage device 220 is executed by the CPU 212, the CPU 212 functions as an inspection unit 214 and an abnormality specifying unit 216. In this regard, part or all of these functions may be configured by hardware circuits.

A maintenance information acquisition unit 218 acquires maintenance information 224 related to maintenance executed with respect to the inspection device 200. The maintenance information acquisition unit 218 acquires as maintenance information 224 information related to maintenance and manually input by a worker or the like who has maintained the inspection device 200. The maintenance information acquisition unit 218 may acquire the maintenance information 224 from the inspection device 200, a management device that integrally manages the maintenance information or the like of the inspection device 200, or the like. The acquired maintenance information 224 is stored in the storage device 220.

The inspection unit 214 inspects whether or not the inspection target vehicle 100 can be normally run by unmanned driving using an inspection side speed acquired by the roller device 250. When the inspection result of the inspection unit 214 indicates an abnormality, the abnormality specifying unit 216 executes an abnormality specifying step that is a processing routine of specifying a cause of the abnormality. In the abnormality specifying step, the abnormality specifying unit 216 specifies which one of the server 300, the inspection device 200, and the inspection target has the abnormality using the maintenance information 224 of the inspection device 200 and the maintenance information 324 of the server 300. An inspection result of the inspection unit 214 and a result obtained by the abnormality specifying unit 216 by specifying the cause of the abnormality are stored as an inspection result 222 in the storage device 220.

FIG. 4A is a flowchart illustrating a processing procedure of running control of a vehicle according to the first embodiment. In step S1, the server 300 acquires vehicle location information using detection result output from an external sensor. The external sensor is located outside the vehicle 100. The vehicle location information is locational information as a basis for generating a running control signal. In the present embodiment, the vehicle location information includes the location and orientation of the vehicle 100 in a reference coordinate system of the factory. In the present embodiment, the reference coordinate system of the factory is a global coordinate system and a location in the factory can be expressed by X, Y, and Z coordinates in the global coordinate system. In the present embodiment, the external sensor is a camera that is disposed in the factory and outputs a captured image as detection result. In step S1, the server 300 acquires the vehicle location information using the captured image acquired from the camera as the external sensor.

More specifically, in step S1, the server 300 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system, thereby acquiring the location of the vehicle 100. The outer shape of the vehicle 100 in the captured image may be detected by inputting the captured image to a detection model using artificial intelligence, for example. The detection model is prepared in the system 50 or outside the system 50. The detection model is stored in advance in a memory of the server 300, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label. The server 300 can acquire the orientation of the vehicle 100 through estimation based on the direction of a motion vector of the vehicle 100 detected from change in location of a feature point of the vehicle 100 between frames of the captured images using optical flow process, for example.

In step S2, the server 300 determines a target location to which the vehicle 100 is to move next. In the present embodiment, the target location is expressed by X, Y, and Z coordinates in the global coordinate system. The memory of the server 300 contains a reference route stored in advance as a route along which the vehicle 100 is to run. The route is expressed by a node indicating a departure place, a node indicating a way point, a node indicating a destination, and a link connecting nodes to each other. The server 300 determines the target location to which the vehicle 100 is to move next using the vehicle location information and the reference route. The server 300 determines the target location on the reference route ahead of a current location of the vehicle 100.

In step S3, the server 300 generates a running control signal for causing the vehicle 100 to run toward the determined target location. In the present embodiment, the running control signal includes an acceleration and a steering angle of the vehicle 100 as parameters. The server 300 calculates a running speed of the vehicle 100 from transition of the location of the vehicle 100 and makes comparison between the calculated running speed and a target speed of the vehicle 100 determined in advance. If the running speed is lower than the target speed, the server 300 generally determines an acceleration in such a manner as to accelerate the vehicle 100. If the running speed is higher than the target speed as, the server 300 generally determines an acceleration in such a manner as to decelerate the vehicle 100. If the vehicle 100 is on the reference route, server 300 determines a steering angle and an acceleration in such a manner as to prevent the vehicle 100 from deviating from the reference route. If the vehicle 100 is not on the reference route, in other words, if the vehicle 100 deviates from the reference route, the server 300 determines a steering angle and an acceleration in such a manner as to return the vehicle 100 to the reference route. In other embodiments, the running control signal may include the speed of the vehicle 100 as a parameter instead of or in addition to the acceleration of the vehicle 100.

In step S4, the server 300 transmits the generated running control signal to the vehicle 100. The server 300 repeats the acquisition of vehicle location information, the determination of a target location, the generation of a running control signal, the transmission of the running control signal, and others in a predetermined cycle.

In step S5, the driving controller of the vehicle 100 receives the running control signal transmitted from the server 300. In step S6, the vehicle 100 controls an actuator of the vehicle 100 using the received running control signal, thereby causing the vehicle 100 to run at the acceleration and the steering angle indicated by the running control signal. The vehicle 100 repeats the reception of a running control signal and the control over the actuator in a predetermined cycle. According to the system 50 in the present embodiment, it becomes possible to move the vehicle 100 without using a transport unit such as a crane or a conveyor.

Figure 4B:
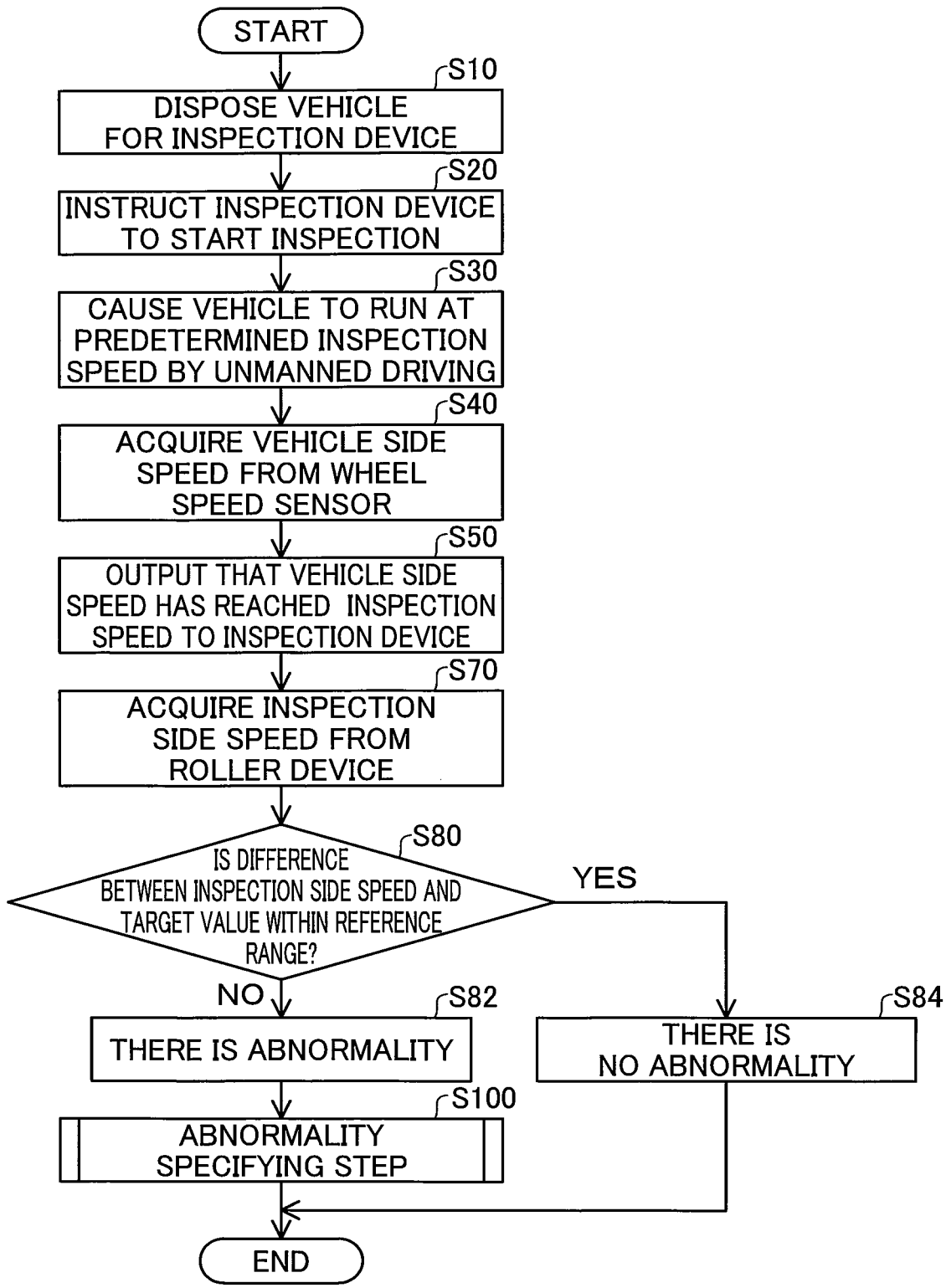
FIG. 4B is a flowchart illustrating a processing routine of an inspection method according to the first embodiment.

FIG. 4B is a flowchart illustrating the processing routine of the inspection method according to the first embodiment. This flow is started by the inspection unit 214 that has detected that the inspection target vehicle 100 has arrived at the inspection step or self-running conveyance of the inspection target vehicle 100 traveling toward the inspection step has started. The arrival of the vehicle 100 at the inspection step can be acquired from, for example, a detection result of the vehicle 100 obtained by a sensor, a camera, or the like provided in the inspection step.

In step S10, the server control unit 312 causes the vehicle 100 to autonomously run by unmanned driving, and disposes the vehicle 100 at the position at which the inspection device 200 can inspect the vehicle 100. That is, the server control unit 312 causes the vehicle 100 to run by remote control, and disposes the vehicle 100 on the roller devices 250 as illustrated in FIG. 1.

In step S20, the server control unit 312 transmits a command signal for starting inspection to the inspection device 200. The inspection unit 214 that has received the command signal starts inspection. The inspection unit 214 may acquire the vehicle identification information from the inspection target vehicle 100 before inspection starts, and cross-check the acquired vehicle identification information and vehicle identification information of the inspection target to be scheduled for production management.

In step S30, the inspection unit 214 gives to the inspection target vehicle 100 an instruction for performing driving such that a running speed is determined in advance as a target value. More specifically, the inspection unit 214 outputs to the server 300 the command signal for causing the vehicle 100 to run at the predetermined running speed. The server control unit 312 that has accepted the command signal drives the actuators of the inspection target vehicle 100 and causes the vehicle 100 to autonomously run at the predetermined running speed by remote control using unmanned driving. Hereinafter, "the running speed determined in advance as the target value" is also referred to as an "inspection speed". The inspection speed can be set to, for example, an arbitrary speed such as 40 km/hr or 60 km/hr. Step S30 is also referred to as a "first step".

In step S40, the vehicle speed acquisition unit 316 acquires the vehicle side speed from the wheel speed sensor 170. The server control unit 312 causes the vehicle 100 to run to maintain the inspection speed when the acquired running speed reaches the inspection speed. In step S50, the vehicle speed acquisition unit 316 outputs that the acquired vehicle side speed has reached the inspection speed to the inspection device 200.

In step S70, the inspection unit 214 acquires the inspection side speed that is a measurement value from the roller device 250. Step S70 is also referred to as a "second step". In step S80, the inspection unit 214 checks whether or not a difference between the acquired inspection side speed and the target value given as the instruction is within a first range. The first range can be set to, for example, an arbitrary range such as ±5 km/hr, ±10 km/hr, −10 km/hr or more, and +5 km/hr or less. The first range may be set according to a legally requested condition or the like. The first range is also referred to as a "reference range". In a case where the difference between the inspection side speed and the target value is within the first range (S80: YES), the inspection unit 214 moves processing to step S84, and outputs that the inspection target has no abnormality.

In a case where the difference between the inspection side speed and the target value is outside the first range (S80: NO), the inspection unit 214 moves the processing to step S82. In step S82, the inspection unit 214 determines that there is the abnormality, and moves the processing to step S100. In step S100, the abnormality specifying unit 216 executes the abnormality specifying step.

When the inspection unit 214 determines that there is an abnormality, it is estimated that the determined abnormality is caused by one of an abnormality of the inspection device 200, an abnormality of the vehicle 100, and an abnormality of the server 300. Examples of the abnormality of the inspection device 200 include an abnormality of the roller device 250 such as an abnormality that the roller 256 or the speed sensor 254 does not normally operate, an abnormality of software or hardware of the inspection control device 210, and the like. The abnormality of the vehicle 100 includes a failure of the wheel speed sensor 170, an abnormality of the ECU 180, and the like. The abnormality of the ECU 180 includes an abnormality of a program stored in the storage device 186, an abnormality of an instruction value, and the like. Examples of the abnormality of the server 300 include an abnormality of a program stored in the storage device 220, an abnormality of a control value, an abnormality of communication of the server communication unit 390, and the like.

Figure 5:
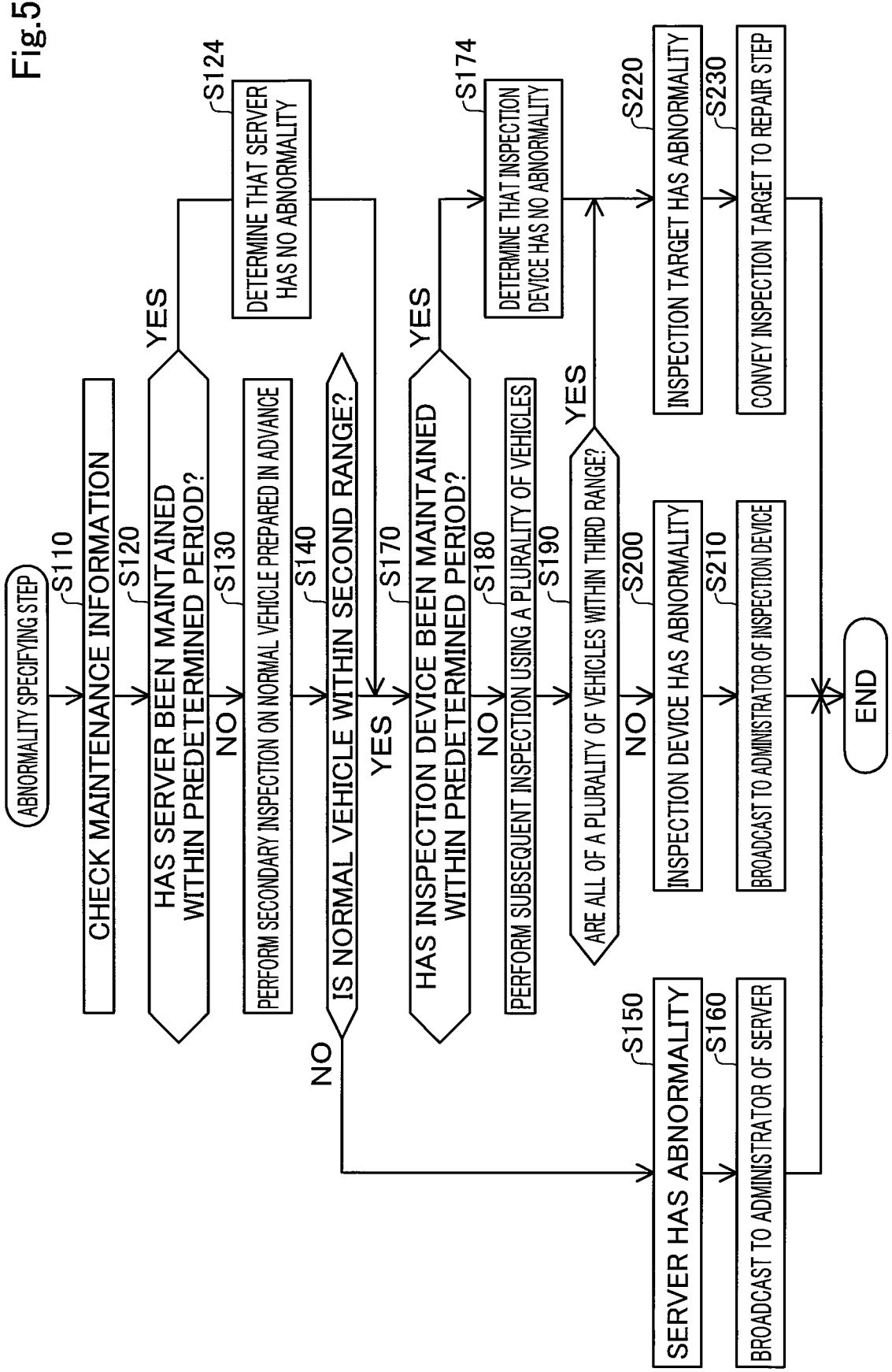
FIG. 5 is a flowchart illustrating a processing routine of an abnormality specifying step.

FIG. 5 is a flowchart illustrating a processing routine of the abnormality specifying step. In step S110, the abnormality specifying unit 216 acquires the maintenance information 224 of the inspection device 200 that is one of the inspection devices, and maintenance information 324 of the server 300 that is the other one of the inspection devices. Note that the maintenance information 224 of the inspection device 200 may be executed before step S170 to be described later. In the present embodiment, the abnormality specifying unit 216 checks information related to execution timings at which the inspection device 200 and the server 300 have been maintained among the acquired maintenance information 224 and maintenance information 324. Step S110 is also referred to as a "maintenance information acquisition step".

In step S120, the abnormality specifying unit 216 checks whether or not the server 300 has been maintained within a predetermined period from a timing at which the inspection unit 214 has acquired the inspection side speed, that is, a timing at which the second step has been executed. The abnormality specifying unit 216 may check whether or not the timing at which the second step has been executed or a current point of time is within the predetermined period from the execution timing at which the server 300 has been maintained. The "predetermined period" in this case refers to a period during which a maintenance effect for the server 300 can be sufficiently obtained. In other words, the predetermined period is a period during which it is possible to sufficiently estimate that the server 300 after maintenance can normally operate. In a case where the timing at which the second step has been executed is outside the predetermined period from the execution timing of maintenance (S120: NO), the abnormality specifying unit 216 moves the processing to step S130.

In step S130, the abnormality specifying unit 216 executes secondary inspection. "Secondary inspection" means performing above-described step S10 to step S80 using the normal vehicle 100 prepared in advance and inspecting whether or not there is an abnormality in the abnormality specifying step. In this regard, the "secondary inspection" may include the same steps as at least the above-described first step and second step. The secondary inspection is one form of a specifying step for specifying whether or not the server 300 has an abnormality.

The "normal vehicle 100" means the vehicle 100 whose output values related to running of the vehicle 100 are normal. The normal vehicle 100 is, for example, the vehicle 100 for which it has been determined that there is no abnormality by inspection of the inspection device 200 in a state where the vehicle 100 is run by manual driving without the server 300, the vehicle 100 immediately after execution of maintenance, the vehicle 100 immediately after it is determined that there is no abnormality using the inspection device 200 immediately after maintenance, the vehicle 100 for which it has been determined that there is no abnormality by an inspection device different from the inspection device 200 instead of or together with the inspection device 200, or the like, that is, the vehicle 100 for which it is possible to sufficiently estimate that the output values related to running of the vehicle 100 indicate no abnormality. The normal vehicle 100 may be the vehicle 100 that is one of these vehicles 100, or the plurality of vehicles 100 that are an arbitrary combination of these vehicles 100. In the present embodiment, at the time of secondary inspection, step S10 to step S80 illustrated in FIG. 4 are performed on the normal vehicle 100 using the inspection device 200 to inspect whether or not there is an abnormality. The normal vehicle 100 may be the vehicle 100 that is a product, or may be a vehicle that is dedicated to inspection other than products.

In a case where the timing at which the second step has been executed is within the predetermined period from the execution timing of maintenance with respect to the server 300 (S120: YES), the abnormality specifying unit 216 moves the processing to step S124, and determines that the server 300 has no abnormality. In this case, the abnormality specifying unit 216 moves the processing to step S170 while omitting steps S130 and S140. That is, when the second step is executed within the predetermined period from the execution timing of maintenance, the secondary inspection that is the specifying step for specifying whether or not the server 300 has an abnormality is omitted, and then it is determined that the server 300 has no abnormality. Note that, instead of or together with omission of the secondary inspection, a normal outputting step of outputting that the server 300 has no abnormality may be executed. This configuration can simplify the step of specifying whether or not the server 300 has an abnormality according to a check result of the maintenance information, and improve productivity of the inspection method according to the present embodiment.

In step S140, the abnormality specifying unit 216 checks a secondary inspection result. That is, the inspection unit 214 checks whether or not a difference between the inspection side speed acquired using the normal vehicle 100, and the target value is within a second range. The second range can be set to, for example, an arbitrary range such as ±5 km/hr, ±10 km/hr, −10 km/hr or more, and +5 km/hr or less. In the present embodiment, the second range is set to the same range as that of the first range. In this regard, the second range and the first range may be set to ranges different from each other. For example, the second range may be set to a range narrower than the first range to make an inspection condition of secondary inspection strict.

In a case where the difference between the inspection side speed and the target value is outside the second range, and it is determined by secondary inspection that there is an abnormality (S140: NO), the abnormality specifying unit 216 moves the processing to step S150, and outputs information indicating that the server 300 has an abnormality. Step S150 is also referred to as a "third step". In step S160, the abnormality specifying unit 216 broadcasts information indicating that the server 300 has the abnormality or information for encouraging repair of the server 300 to an administrator of the server 300 or the like, and finishes this flow.

In a case where the difference between the inspection side speed and the target value is within the second range, and it is determined by secondary inspection that there is no abnormality (S140: YES), the abnormality specifying unit 216 moves the processing to step S170. In step S170, the abnormality specifying unit 216 checks whether or not the inspection device 200 has been maintained within a predetermined period from a timing at which the second step has been executed. The "predetermined period" in this case refers to a period during which a maintenance effect for the inspection device 200 can be sufficiently obtained. In other words, the predetermined period is a period during which it is possible to sufficiently estimate that the inspection device 200 after maintenance can normally operate. In a case where the timing at which the second step has been executed is outside the predetermined period from the execution timing of maintenance (S170: NO), the abnormality specifying unit 216 moves the processing to step S180.

In step S180, the abnormality specifying unit 216 performs subsequent inspection using the plurality of vehicles 100 different from the inspection target vehicle 100. "Subsequent inspection" means performing step S10 to step S80 illustrated in FIG. 4B using the plurality of vehicles 100 different from the inspection target vehicle 100 and the normal vehicle 100 to inspect whether or not there is an abnormality. The subsequent inspection is one form of a specifying step for specifying whether or not the inspection device 200 has an abnormality. The subsequent inspection step may include at least the first step and the second step.

The plurality of vehicles 100 used in the subsequent inspection step are preferably the plurality of vehicles 100 that are scheduled to be continuously inspected subsequently to the inspection target vehicle 100. Subsequent inspection of the plurality of vehicles 100 also plays a function of normal inspection of the plurality of vehicles 100, so that it is possible to suppress a decrease in productivity of the inspection step of the subsequent inspection. Note that the number of the plurality of vehicles 100 used for the subsequent inspection may be set to an arbitrary number equal to or more than two. From a viewpoint of improvement of inspection accuracy, the number of the vehicles 100 is preferably large.

In a case where the timing at which the second step has been executed is within the predetermined period from the execution timing of maintenance with respect to the inspection device 200 (S170: YES), the abnormality specifying unit 216 moves the processing to step S174, and determines that the inspection device 200 has no abnormality. In this case, the abnormality specifying unit 216 moves the processing to step S220 while omitting steps S180 and S190. That is, when the second step is executed within the predetermined period from the execution timing of maintenance, the subsequent inspection that is the specifying step for specifying whether or not the inspection device 200 has an abnormality is omitted, and then it is determined that the inspection device 200 has no abnormality. Note that, instead of or together with omission of the subsequent inspection, the normal outputting step of outputting that the inspection device 200 has no abnormality may be executed. This configuration can simplify the step of specifying whether or not the inspection device 200 has an abnormality according to a check result of the maintenance information, and improve productivity of the inspection method according to the present embodiment.

In step S190, an inspection result of the plurality of vehicles 100 is checked. In a case where a difference between the acquired inspection side speed and an instructed target value is outside a third range in the at least one vehicle 100 of the plurality of vehicles 100 at a time of subsequent inspection (S190: NO), the abnormality specifying unit 216 moves the processing to step S200, and outputs that the inspection device 200 has an abnormality. The third range can be set to, for example, an arbitrary range such as ±5 km/hr, ±10 km/hr, −10 km/hr or more, and +5 km/hr or less. In the present embodiment, the third range is set to the same range as that of the first range. In this regard, the third range and the first range may be set to ranges different from each other. For example, the third range may be set to a range narrower than the first range to make an inspection condition of subsequent inspection strict. In step S210, the abnormality specifying unit 216 broadcasts information indicating that the inspection device 200 has the abnormality or information for encouraging repair of the inspection device 200 to an administrator of the inspection device 200 or the like.

In a case where the difference between the acquired inspection side speed and the target value given as an instruction is within the third range in all of the vehicles 100 of the plurality of vehicles 100 at a time of subsequent inspection in step S190 (S190: YES), the abnormality specifying unit 216 moves the processing to step S220, and outputs information indicating that the inspection target vehicles 100 have abnormalities. Step S220 is also referred to as a "fourth step". In step S230, the server control unit 312 causes the inspection target vehicle 100 to run by remote control from the inspection step to a repair step in which the vehicle 100 can be repaired, and finishes this flow.

As described above, the inspection method according to the present embodiment includes the maintenance information acquiring step of acquiring the maintenance information 224 and the maintenance information 324 related to the history of maintenance executed with respect to the server 300 and the inspection device 200, and the abnormality specifying step of, when the difference between the inspection side speed and the target value is not within the reference range, specifying which one of the server 300, the inspection device 200, and the inspection target vehicle 100 has an abnormality using the acquired maintenance information 224 and 324. Consequently, at a time of inspection that uses the server 300 and the inspection device 200 in the vehicle 100 that can run by remote control, it is possible to highly reliably specify a cause of the abnormality by determining which one of the inspection target vehicle 100, the inspection device 200, and the server 300 has the abnormality.

According to the inspection method according to the present embodiment, the abnormality specifying unit 216 checks the information related to the execution timings at which the server 300 and the inspection device 200 have been maintained among the maintenance information. It is possible to specify the cause of the abnormality by a simple method for checking the execution timing of the maintenance. Furthermore, by using a maintenance effect for the device to specify the cause of the abnormality, it is possible to simplify specifying the cause of the abnormality.

According to the inspection method according to the present embodiment, in the abnormality specifying step, when the timing at which the second step is executed is within the predetermined period from the execution timing of maintenance of the server 300 and the inspection device 200, it is determined that the server 300 and the inspection device 200 having been maintained have an abnormality. Consequently, it is possible to omit the secondary inspection and the subsequent inspection according to the maintenance information, and it is possible to simplify the abnormality specifying step during a period during which the maintenance effect for the device can be obtained.

B. Second Embodiment

Figure 6:
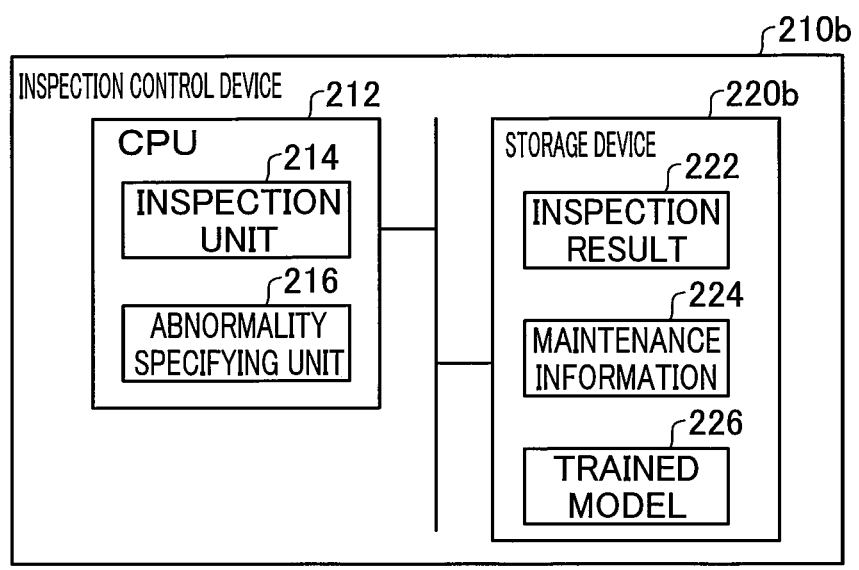
FIG. 6 is a block diagram illustrating an internal functional configuration of the inspection control device that executes the inspection method according to a second embodiment.

FIG. 6 is a block diagram illustrating an internal functional configuration of an inspection control device 210*b* that executes the inspection method according to the second embodiment. The inspection control device 210*b* differs from the inspection control device 210 described in the first embodiment in including a storage device 220*b* that stores a trained model 226 instead of the storage device 220, and other components are the same as those in the inspection control device 210.

The trained model 226 is a machine learning model that detects an abnormality. The trained model 226 inputs input/output data at a time of inspection of the inspection device 200, the server 300, and an inspection target and maintenance information to the trained model 226 to output abnormality probabilities of the inspection device 200, the server 300, and the inspection device.

The trained model 226 is, for example, a machine learning model that uses a Neural Network (NN). The machine learning model is suitably, for example, a model having an architecture such as a Recurrent Neural Network (RNN), a Convolutional Neural Network (CNN), a general regression neural network, or a random forest. The present embodiment adopts a learning model that includes the RNN having a recursive structure such as a Long Short-Term Memory (LSTM) that can perform long-term time-series analysis. The machine learning model may be a machine learning model that uses an algorithm such as the k-nearest neighbor method, the Hotelling's theory, the Local Outlier Factor (LOF) method, and the naive Bayes method instead of the neural network. Furthermore, the abnormality probability may be predicted using not only machine learning, but also various methods such as regression analysis such as multiple regression analysis, and multivariate analysis.

The trained model 226 has been trained using past data of input/output data of the inspection device 200, the server 300, and the inspection target, past data of the inspection result 222 of the inspection system 500 associated with the inspection device 200, the server 300, and the inspection target, past data related to maintenance information, and past data related to whether the server 300, the inspection device 200, and the inspection target are normal or abnormal. As a training method of the neural network, a Support Vector Machine (SVM) or backpropagation is preferably used. Note that not only both of input data and output data of each device, but also only one of the input data and the output data may be input to the machine learning model. By inputting the input/output data at the time of inspection of the inspection device 200, the server 300, and the inspection target, and the maintenance information to the trained model 226, the abnormality probability of each of the inspection device 200, the server 300, and the inspection device is output. At this time, within, for example, the predetermined period from the execution timing of maintenance, a probability that a device for which this maintenance has been executed has no abnormality is higher than a probability in a period during which maintenance is not executed.

Figure 7:
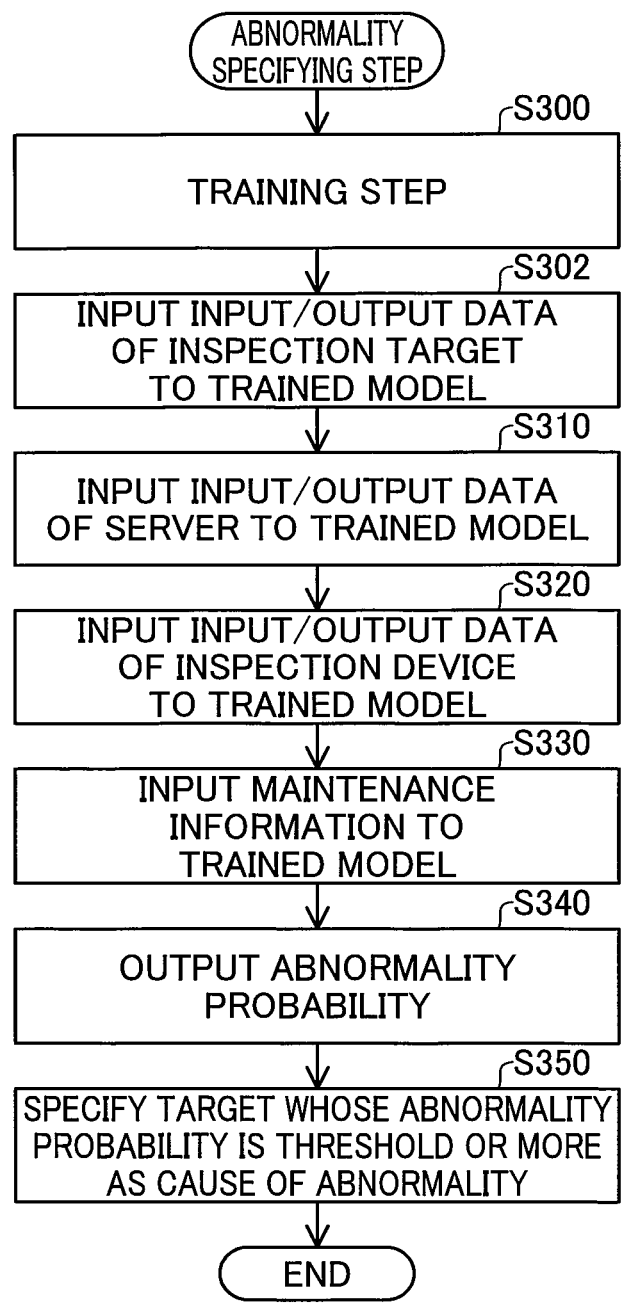
FIG. 7 is a flowchart illustrating a processing routine of the abnormality specifying step according to the second embodiment.

FIG. 7 is a flowchart illustrating a processing routine of the abnormality specifying step according to the second embodiment. In step S300, using the past data of the input/output data of the inspection device 200, the server 300, and the inspection target, the past data of the inspection result 222 of the inspection system 500 associated with the inspection device 200, the server 300, and the inspection target, the past data related to the maintenance information, and the past data related to whether the server 300, the inspection device 200, and the inspection target are normal or abnormal, the machine learning model is trained. Step S300 is also referred to as a "training step". The training step may be performed in advance differently from the abnormality specifying step.

In step S302, the abnormality specifying unit 216 inputs the input/output data of the inspection target to the trained model 226. The input/output data of the inspection target is, for example, various items of input/output data obtained from the vehicle 100 during inspection illustrated in FIG. 4B such as the rotational speed of the motor 140 of the vehicle 100 at the time of inspection, the vehicle speed data 322 that is the vehicle side speed obtained from the wheel speed sensor 170, a control value of each actuator of the vehicle 100 by the driving control unit 184, and the output value of each actuator. Note that only a significant factor for the inspection result among the various items of input/output data obtained from the vehicle 100 may be extracted.

In step S310, the abnormality specifying unit 216 inputs the input/output data of the server 300 to the trained model 226. The input/output data of the server 300 is various items of input/output data obtained from the server 300 during inspection illustrated in FIG. 4 such as a control value, an inspection time, and the vehicle speed data 322 transmitted from the server 300 to the vehicle 100 by remote control at the time of inspection. Note that only a significant factor for the inspection result among the various items of input/output data obtained from the server 300 may be extracted.

In step S320, the abnormality specifying unit 216 inputs the input/output data of the inspection device 200 to the trained model 226. The input/output data of the inspection device 200 is various items of input/output data obtained from the inspection device 200 during inspection illustrated in FIG. 4 such as the inspection side speed obtained from the roller device 250, the torque/the rotational speed/the rotation speed of the motor 252 or the roller 256 at the time of inspection, the inspection time, and the inspection result 222. Note that only a significant factor for the inspection result among the various items of input/output data obtained from the inspection device 200 may be extracted.

In step S330, the abnormality specifying unit 216 acquires the maintenance information 224 and 324 to input to the trained model 226. Only a significant factor for the inspection result among the maintenance information 224 and 324 may be extracted, and input to the trained model 226.

In step S340, the trained model 226 outputs the abnormality probability of each of the inspection device 200, the server 300, and the inspection target vehicle 100 on the basis of the data input in above step S302 to step S330. In step S350, the abnormality specifying unit 216 compares each abnormality probability and a threshold arbitrarily set in advance, and specifies a cause of an abnormality. For example, the abnormality specifying unit 216 specifies the device or the inspection target whose abnormality probability is a predetermined threshold or more as the cause of the abnormality.

As described above, the inspection method according the present embodiment further includes the training step of training the machine learning model using the past data related to input/output of the server 300, the past data related to input/output of the inspection device 200, the past data related to the maintenance information 324, and the past data related to whether the server 300, the inspection device 200, and the inspection target vehicle 100 are normal or abnormal. In the abnormality specifying step, which one of the server 300, the inspection device 200, and the inspection target vehicle 100 has the abnormality is specified using the trained model 226. Consequently, it is possible to improve productivity of the abnormality specifying step and accuracy of specifying the cause of the abnormality using the trained model 226.

C. Third Embodiment

Figure 8:
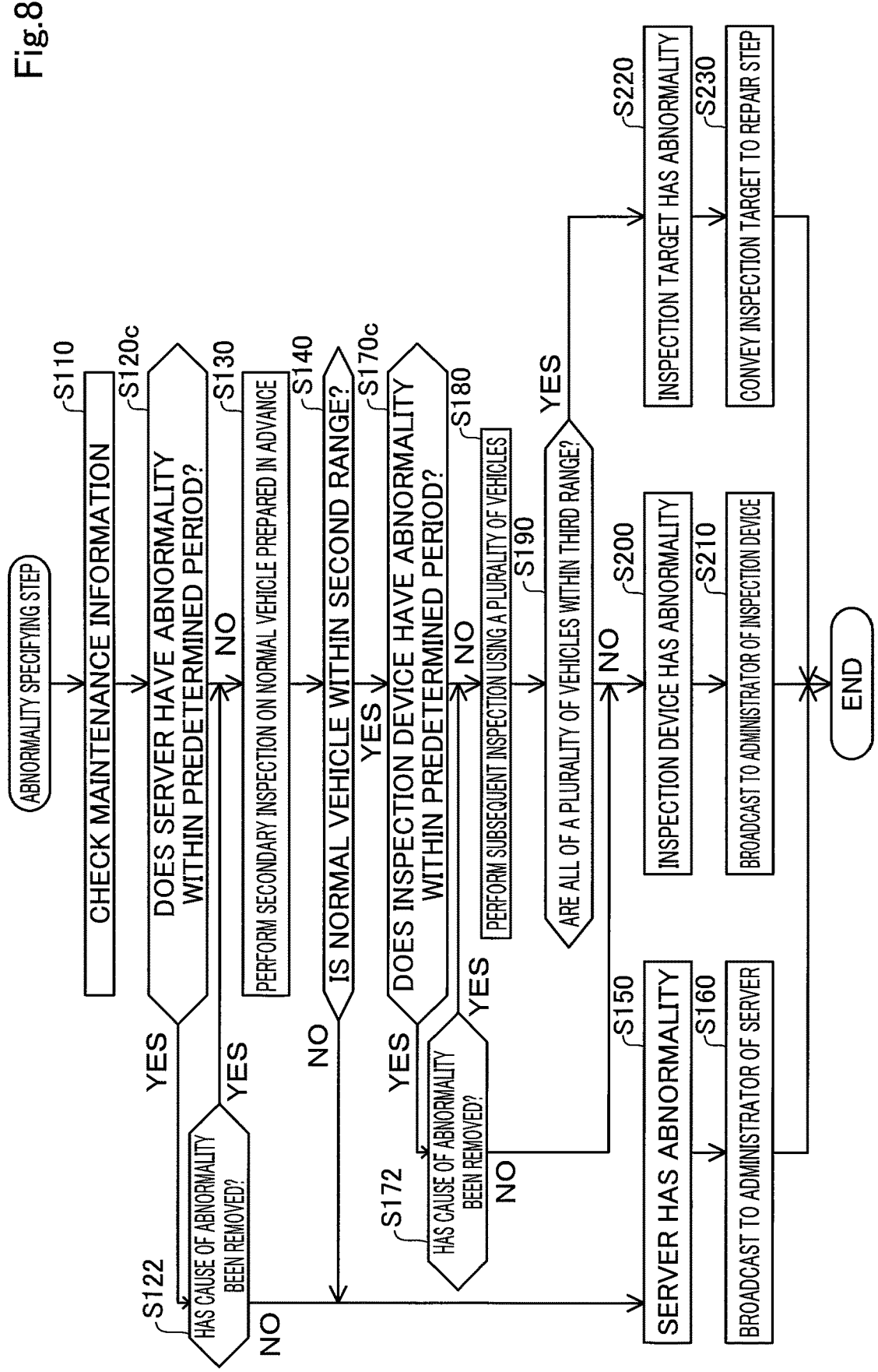
FIG. 8 is a flowchart illustrating the processing routine of an abnormality specifying step of the inspection method according to a third embodiment.

FIG. 8 is a flowchart illustrating the processing routine of the abnormality specifying step of the inspection method according to the third embodiment. In the present embodiment, the abnormality specifying step differs from the abnormality specifying step included in the inspection method according to the first embodiment in including steps S120c and S170c instead of steps S120 and S170, and further including steps 122 and S172. The above first embodiment has described the example where the execution timing at which maintenance has been executed among the maintenance information is used to specify the cause of the abnormality. By contrast with this, in the present embodiment, information related to whether or not abnormalities of the server 300 and the inspection device 200 have been detected at a time of maintenance among maintenance information is used to specify the causes of the abnormalities.

In step S120c, the abnormality specifying unit 216 checks the maintenance information, and checks whether or not the maintenance information includes information indicating that the abnormality has been detected from the server 300 at the time of maintenance. The "abnormality" in this case may not include a light abnormality that does not undermine the function of the server 300. Furthermore, maintenance of a target for which whether or not the abnormality has been detected is checked is not limited to all previously executed maintenance, may be maintenance in a predetermined period or latest maintenance, or may be a predetermined number of times of previously performed maintenance.

In a case where the maintenance information does not include the information indicating that the abnormality of the server 300 has been detected at the time of maintenance (S120c: NO), the abnormality specifying unit 216 moves the processing to step S130. In a case where the maintenance information includes the information indicating that the abnormality of the server 300 has been detected at the time of maintenance (S120c: YES), the abnormality specifying unit 216 moves the processing to step S122.

In step S122, the abnormality specifying unit 216 further checks the maintenance information 324, and checks whether or not the cause of the abnormality detected in step S120c has already been removed. That "the cause of the abnormality has been removed" means a state where the cause of the abnormality has been specified, the specified cause has been removed, and it is possible to sufficiently estimate that a target device can normally operate. A case where, for example, an abnormality caused by a failure of a member is detected at a time of maintenance, and the member having caused the failure is exchanged with a new part or the like corresponds to a state where the member having caused the abnormality is removed.

In the case where the maintenance information does not include the information indicating that the cause of the abnormality of the server 300 has been removed (S122: NO), the abnormality specifying unit 216 moves the processing to step S150, and outputs information indicating that the server 300 has the abnormality. That is, the secondary inspection that is the specifying step for specifying whether or not the server 300 has the abnormality is omitted, and then an abnormality outputting step of outputting information indicating that the server 300 has the abnormality is executed.

In the case where the maintenance information includes the information indicating that the cause of the abnormality of the server 300 has been removed (S122: YES), the abnormality specifying unit 216 moves the processing to step S130, and executes the secondary inspection. In other words, although the server 300 has been maintained, the abnormality has been detected at the time of maintenance, whether or not the server 300 has the abnormality is checked by the secondary inspection. In this regard, the present discloser is not limited to this, and, in a case where it is possible to sufficiently estimate that the abnormality of the server 300 is removed and it is possible to sufficiently estimate that the server 300 normally operates, the abnormality specifying unit 216 determines that the server 300 has no abnormality, omits the secondary inspection, and then moves the processing to step S170c.

In step S170c, the abnormality specifying unit 216 checks the maintenance information, and checks whether or not the maintenance information includes information indicating that the abnormality has been detected from the inspection device 200 at the time of maintenance. The "abnormality" in this case may not include a light abnormality that does not undermine the function of the inspection device 200. In a case where the maintenance information does not include the information indicating that the abnormality of the inspection device 200 has been detected at the time of maintenance (S170c: NO), the abnormality specifying unit 216 moves the processing to step S180. In a case where the maintenance information includes the information indicating that the abnormality of the inspection device 200 has been detected at the time of maintenance (S170c: YES), the abnormality specifying unit 216 moves the processing to step S172.

In step S172, the abnormality specifying unit 216 further checks the maintenance information 224, and checks whether or not the cause of the abnormality detected in step S170c has already been removed. In the case where the cause of the abnormality of the inspection device 200 is not removed (S172: NO), the abnormality specifying unit 216 moves the processing to step S200, and outputs that the inspection device 200 has the abnormality. That is, the subsequent inspection step that is the specifying step for specifying whether or not the inspection device 200 has the abnormality is omitted, and then the abnormality outputting step of outputting information indicating that the inspection device 200 has the abnormality is executed.

In the case where the maintenance information includes the information indicating that the cause of the abnormality of the inspection device 200 has been removed (S172: YES), the abnormality specifying unit 216 moves the processing to step S180, and executes the subsequent inspection step. In other words, although the inspection device 200 has been maintained, the abnormality has been detected at the time of maintenance, and therefore whether or not the inspection device 200 has the abnormality is checked by the subsequent inspection step. In this regard, the present discloser is not limited to this, and, in a case where it is possible to sufficiently estimate that the abnormality of the inspection device 200 is removed and it is possible to sufficiently estimate that the inspection device 200 normally operates, the abnormality specifying unit 216 determines that the inspection device 200 has no abnormality, omits the subsequent inspection step, and moves the processing to step S220.

As described above, according to the inspection method according to the present embodiment, the abnormality specifying unit 216 checks as the maintenance information the information related to the whether or not an abnormality of at least one of the server 300 and the inspection device 200 has been detected at the time of maintenance of the server 300 and the inspection device 200. It is possible to highly reliably specify the cause of the abnormality by a simple method for checking whether or not there is an abnormality at the time of maintenance.

According to the inspection method according to the above aspect, the abnormality specifying step executes the specifying step of, when the maintenance information includes information indicating that the abnormality of the one target device of the server 300 and the inspection device 200 has been detected at a time of the maintenance, and further includes information indicating that a member that has caused the abnormality of the one target device from which the abnormality has been detected has been exchanged, specifying the device from which the member having caused the abnormality is exchanged. Even when the abnormality is detected at the time of maintenance, and when a cause of the abnormality is removed, there is a probability that the device has no abnormality. Consequently, it is possible to appropriately specify the cause of the abnormality taking into account a case where the abnormality at a time of maintenance is repaired.

D. Fourth Embodiment

Figure 9:
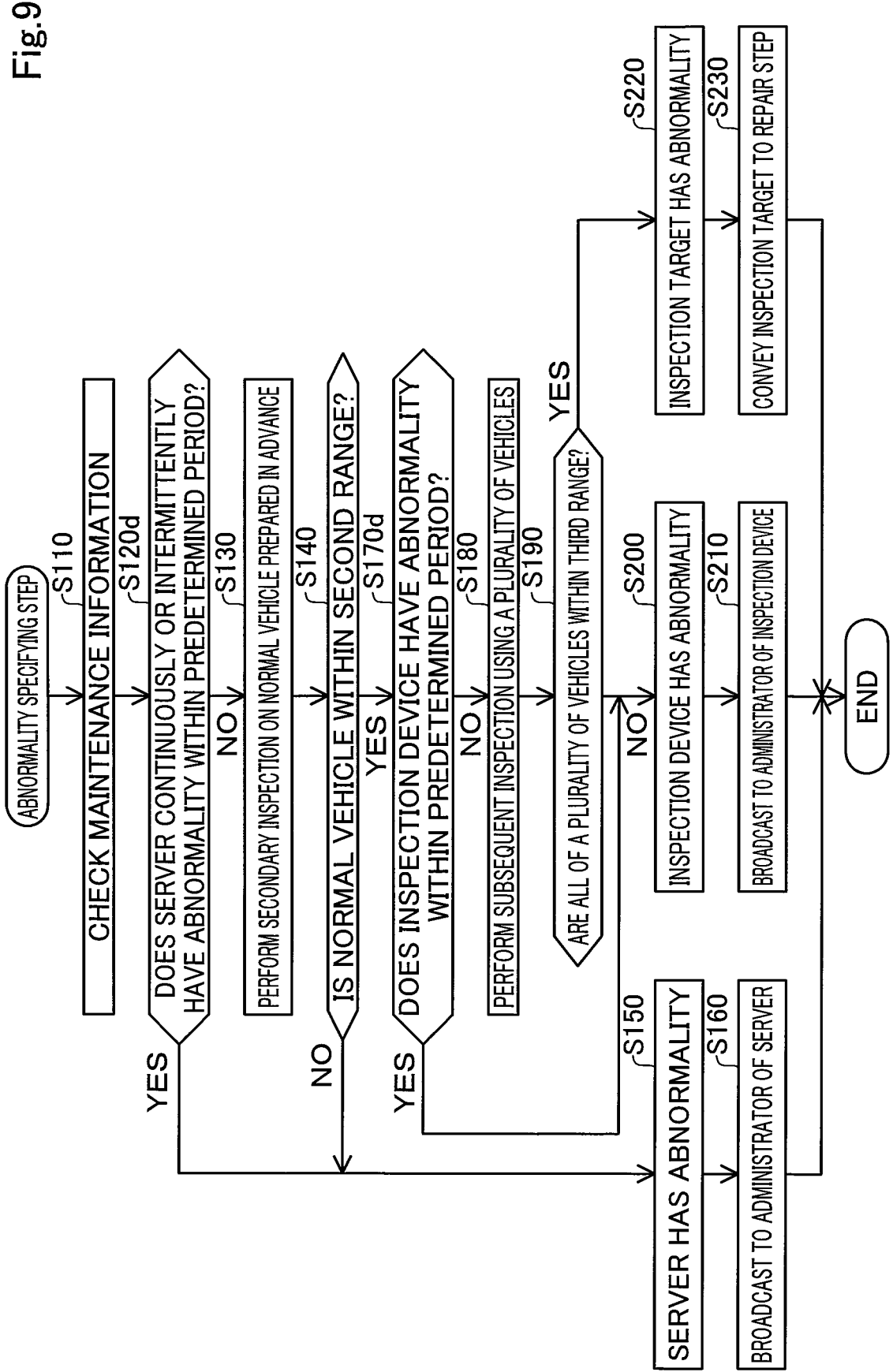
FIG. 9 is a flowchart illustrating the processing routine of the abnormality specifying step of the inspection method according to a fourth embodiment.

FIG. 9 is a flowchart illustrating the processing routine of the abnormality specifying step of the inspection method according to the fourth embodiment. In the present embodiment, the abnormality specifying step differs from the abnormality specifying step included in the inspection method according to the first embodiment in including steps S120d and S170d instead of steps S120 and S170. The above first embodiment has described the example where the execution timing at which maintenance has been executed among the maintenance information is used. By contrast with this, in the present embodiment, information related to whether or not abnormalities of the server 300 and the inspection device 200 have been continuously or intermittently detected at a time of maintenance among maintenance information is used.

In step S120d, the abnormality specifying unit 216 checks the maintenance information, and checks whether or not the maintenance information includes information indicating that the abnormality has been continuously or intermittently detected from the server 300 at the time of maintenance. "The abnormality is continuously detected" means that the abnormality is continuously detected by a number of times of maintenance equal to or more than a predetermined first threshold equal to or more than two. The first threshold may be set using an arbitrary number of times at which it is estimated that a probability that a target device has an abnormality is sufficiently high. "The abnormality is intermittently detected" means that the abnormality is detected a number of times equal to or more than a predetermined second threshold equal to or more than two in a predetermined period or by a predetermined number of times of maintenance. The predetermined period/number of times, and the second threshold may be set using an arbitrary period/number of times at which it is estimated that a probability that a target device has an abnormality is sufficiently high. Furthermore, "the continuously or intermittently detected abnormality" in this case may not include a light abnormality that does not undermine the function of the server 300. The continuously or intermittently detected abnormality may include both of a case where the same abnormality is continuously or intermittently detected, and a case where different abnormalities are continuously or intermittently detected.

In a case where the maintenance information does not include the information indicating that a continuous or intermittent abnormality of the server 300 has been detected at the time of maintenance (S120d: NO), the abnormality specifying unit 216 moves the processing to step S130. In a case where the maintenance information includes the information indicating that the continuous or intermittent abnormality has been detected (S120d: YES), the abnormality specifying unit 216 moves the processing to step S150, and outputs information indicating that the server 300 has the abnormality. In other words, it is estimated that a device from which the continuous or intermittent abnormality is detected is highly likely to have a recurring abnormality of the device, the secondary inspection or the subsequent inspection that is the specifying step is omitted, and the abnormality outputting step of outputting information indicating that the device has the abnormality is executed. Note that, in the present embodiment, it is preferable not to apply a case where the abnormality is removed as in step S122 illustrated in FIG. 8.

In step S170d, similar to step S120d, the abnormality specifying unit 216 checks the maintenance information, and checks whether or not the maintenance information includes information indicating that the abnormality has been continuously or intermittently detected from the inspection device 200 at the time of maintenance. "The continuously or intermittently detected abnormality" in this case may not include a light abnormality that does not undermine the function of the inspection device 200. Furthermore, the continuously or intermittently detected abnormality may include both of a case where the same abnormality is continuously or intermittently detected, and a case where different abnormalities are continuously or intermittently detected.

In a case where the maintenance information does not include the information indicating that the continuous or intermittent abnormality of the inspection device 200 has been detected at the time of maintenance (S170*d*: NO), the abnormality specifying unit 216 moves the processing to step S180. In a case where the maintenance information includes the information indicating that the continuous or intermittent abnormality has been detected (S170*d*: YES), the abnormality specifying unit 216 moves the processing to step S200, and outputs that the inspection device 200 has the abnormality. Note that, in the present embodiment, it is preferable not to apply a case where the abnormality is removed as in step S172 illustrated in FIG. 8.

As described above, according to the inspection method according to the present embodiment, the abnormality specifying unit 216 checks as the maintenance information the information related to the whether or not an abnormality of at least one target device of the server 300 and the inspection device 200 has been continuously or intermittently detected at the time of maintenance of the server 300 and the inspection device 200. It is possible to highly reliably specify the cause of the abnormality by a simple method for checking whether or not there is a continuous or intermittent abnormality at the time of maintenance.

According to the inspection method according to the above aspect, in the abnormality specifying step, when the maintenance information includes the information indicating that the abnormality of the one target device of the server 300 and the inspection device 200 has been continuously or intermittently detected at the time of the maintenance, that the device from which the abnormality has been detected has the abnormality is output. It is possible to simplify the specifying step by a simple method for checking whether or not there is the continuous or intermittent abnormality at the time of the maintenance, and simplify the abnormality specifying step.

E. Fifth Embodiment

Figure 10:
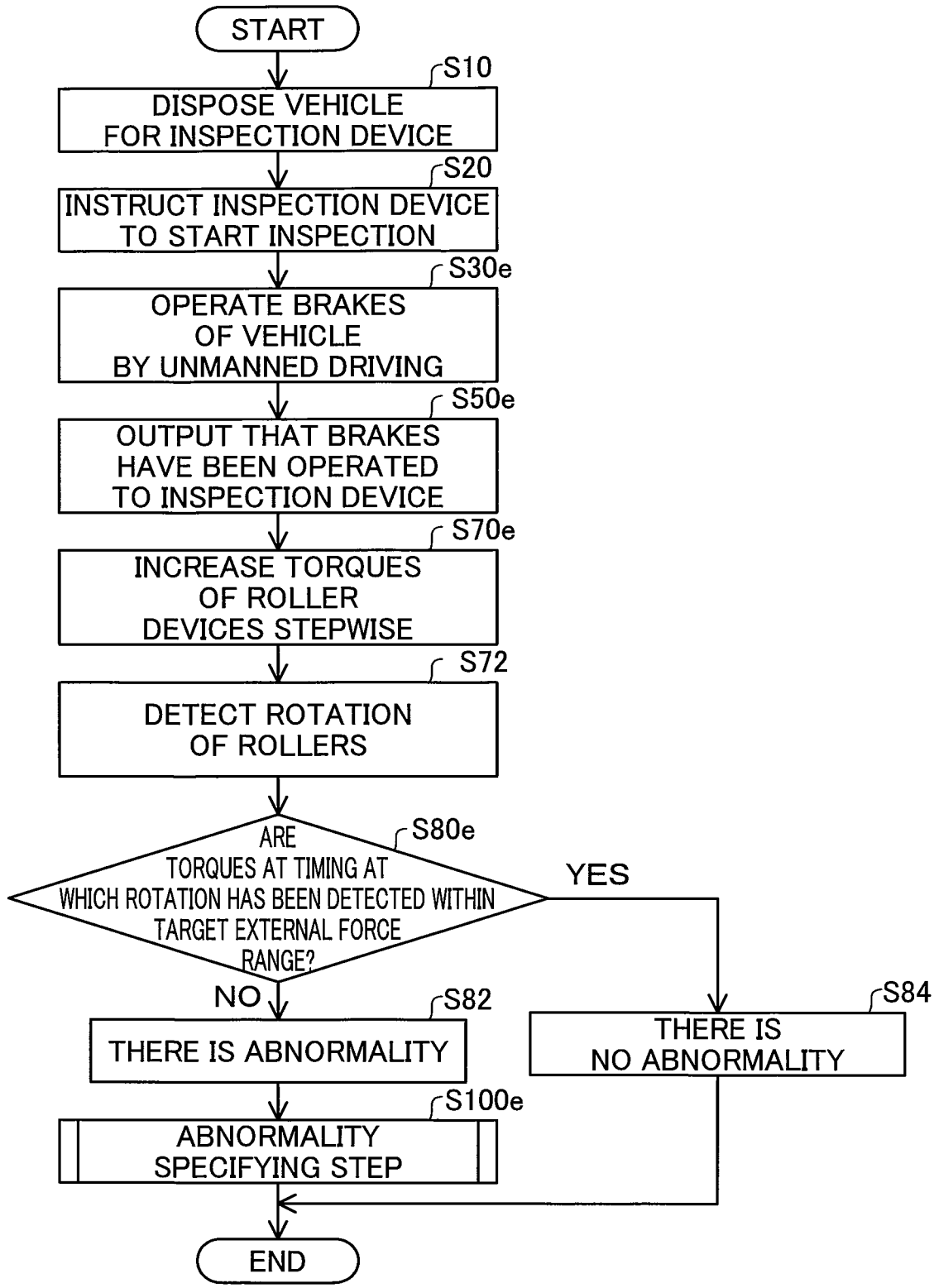
FIG. 10 is a flowchart illustrating the processing routine of the inspection method according to a fifth embodiment.
Figure 11:
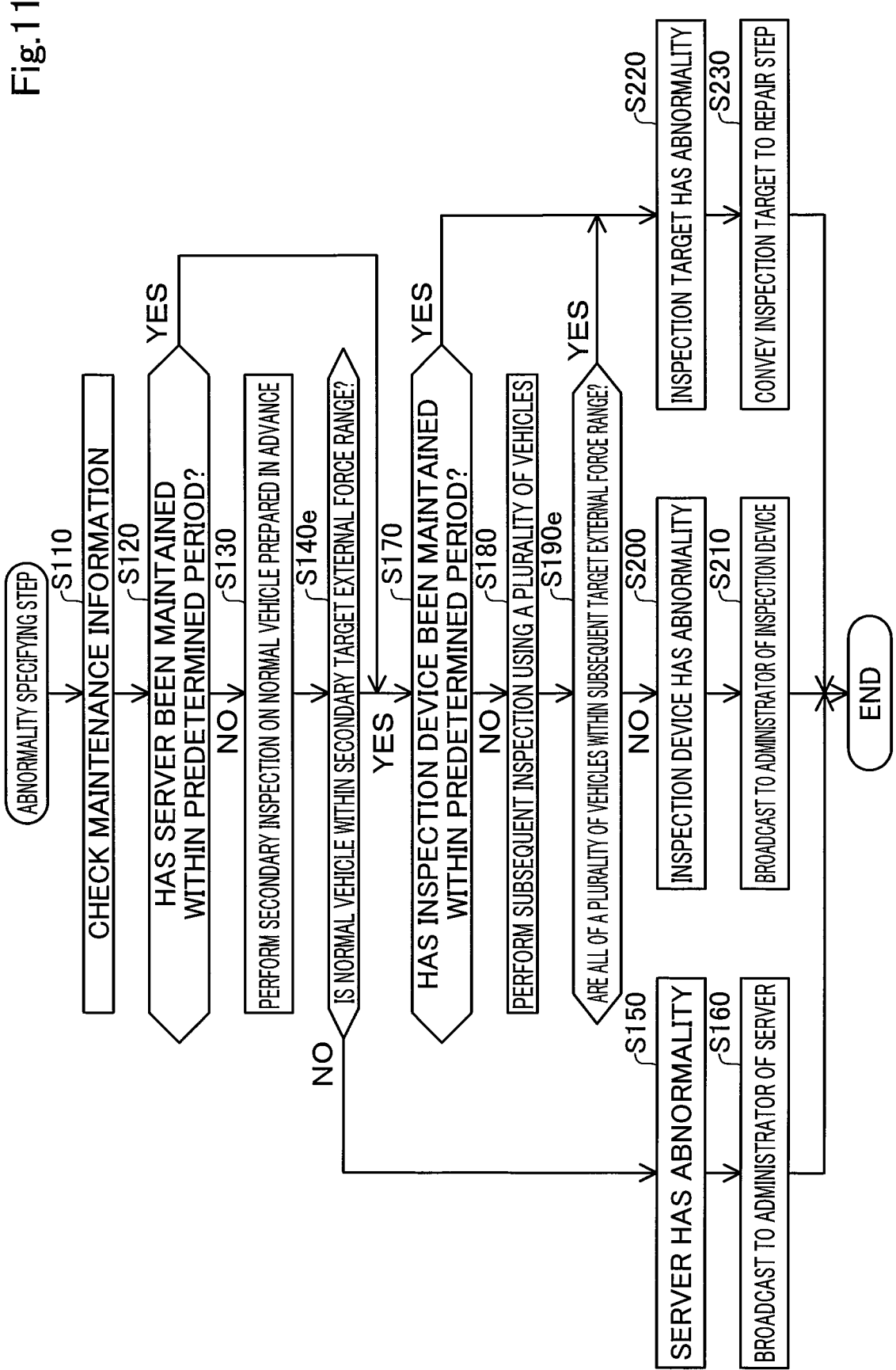
FIG. 11 is a flowchart illustrating the processing routine of the abnormality specifying step of the inspection method according to the fifth embodiment.

FIG. 10 is a flowchart illustrating the processing routine of the inspection method according to the first embodiment. The example has been described where the inspection method according to the first embodiment inspects an abnormality related to the running speed of the vehicle 100, the inspection method according to the present embodiment inspects whether or not the brakes 162 of the vehicle 100 appropriately operate, As illustrated in FIG. 11, this flow differs from the inspection method according to the first embodiment illustrated in FIG. 4 in including steps S30*e*, S50*e*, S70*e*, and S80*e* instead of steps S30, S50, S70, and S80, and not including step S40. Note that this flow may be continuously executed in a state where the vehicle 100 is disposed for the inspection device 200, for example, after inspection in the first embodiment is completed. In this case, it is possible to omit steps S10 and S20 in this flow.

In step S30*e*, the inspection unit 214 gives to the inspection target vehicle 100 an instruction of causing the brakes 162 that are the stop units to operate, and stopping rotation of the wheels 160, that is, stopping a running operation of the vehicle 100. More specifically, the inspection unit 214 outputs to the server 300 the command signal for causing the brakes 162 to operate such that the braking force is the predetermined target value. The server control unit 312 having received the command signal causes the brakes 162 of the inspection target vehicle 100 to have a predetermined braking force, and stop the running operation of the vehicle 100 by remote control. Step S30*e* is also referred to as a "stop instruction step".

In step S50*e*, the server control unit 312 outputs to the inspection device 200 information indicating that the brakes 162 have been operated according to the target value. In step S70*e*, the inspection unit 214 drives the motors 252 of the roller devices 250, and rotates the rollers 256. More specifically, the inspection unit 214 rotates the rollers 256 in contact with the wheels 160, and applies to the wheels 160 an external force for rotating the wheels 160 in the forward rotation direction. "The external force for rotating the wheels 160 in the forward rotation direction" is, for example, a force applied to the outer circumference of the roller 256 by the motor 252 or a torque of the roller 256 corresponding to the force. The inspection unit 214 increases the torque of the roller 256 stepwise until the speed sensor 254 or the like detects rotation of the wheel 160.

In step S72, when the roller 256 rotates, the inspection unit 214 detects rotation of the roller 256, that is, rotation of the wheel 160 using the speed sensor 254. The inspection unit 214 acquires the torque applied to the roller 256 at a timing at which rotation of the wheel 160 is detected. Steps S70*e* and S72 are also referred to as an "external force acquisition step".

In step S80*e*, whether or not a difference between the torque applied to the roller 256 at the timing at which rotation of the wheel 160 is detected, and a torque corresponding to the braking force that is the target value is within a predetermined target external force range is checked. The target external force range can be set to an arbitrary range such as ±5 Nm (neutron metre) in a case of the torque, and ±5 N (neutron) in a case of the external force. In step S80*e*, whether or not the brake 162 applies the braking force that corresponds to the target value to the wheel 160 can be inspected. Also, it is also possible to inspect a malfunction that the wheel 160 does not rotate even when a predetermined external force is applied in a state where the brake 162 is activated.

In a case where the difference between the torque applied to the roller 256 and the torque corresponding to the braking force that is the target value is within the target external force range (S80*e*: YES), the inspection unit 214 moves processing to step S84, and outputs that there is no abnormality. In a case where the difference between the torque applied to the roller 256 and the torque corresponding to the braking force that is the target value is outside the target external force range (S80*e*: NO), the inspection unit 214 moves the processing to step S82 to determine that there is an abnormality, and moves the processing to step S100*e* to execute the abnormality specifying step according to the second embodiment.

FIG. 11 is a flowchart illustrating the processing routine of the abnormality specifying step of the inspection method according to the fifth embodiment; The present embodiment differs from the abnormality specifying step described in the first embodiment in including step S140*e* instead of step S140, and further including step S190*e* instead of step S190, and the other points are the same.

In step S140*e*, an inspection result of the normal vehicle 100 is checked. More specifically, step S10 to step S80*e* illustrated in FIG. 10 are executed using the normal vehicle 100. Whether or not the difference between the torque applied to the roller 256 and the torque corresponding to the braking force that is the target value is within a secondary target external force range is inspected for the plurality of vehicles 100. The secondary target external force range can be set similarly to the target external force range. In the present embodiment, the secondary external force range is set to the same range as that of the target external force range. In a case where the difference between the torque of the roller 256 and the torque of the target value is outside the secondary target external force range in the normal vehicle 100 (S140e: NO), the processing is moved to step S170 to output information indicating that the server 300 has an abnormality.

In step S190e, an inspection result of the plurality of vehicles 100 is checked. More specifically, step S10 to step S80e illustrated in FIG. 10 are executed using the plurality of vehicles 100. In a case where the difference between the torque of the roller 256 and the torque of the target value is within a predetermined subsequent target external force range in the all vehicles 100 of the plurality of vehicles 100 (S190e: YES), the processing is moved to step S220 to output information indicating that the inspection target has an abnormality.

In a case where the difference between the torque of the roller 256 and the torque of the target value is outside the predetermined subsequent target external force range in the one vehicle 100 of the plurality of vehicles 100 (S190e: NO), the processing is moved to step S200 to output information indicating that the inspection device 200 has an abnormality. In the present embodiment, the subsequent target external force range is set to the same range as that of the target external force range.

As described above, the inspection method according to the present embodiment can specify that the server 300 among the inspection target vehicle 100, the inspection device 200, and the server 300 is a cause of the abnormality even at a time of inspection of the brakes 162 of the vehicle 100 that runs by remote control similarly to the above first embodiment. Furthermore, it is also possible to improve productivity by simplifying the abnormality specifying step using the maintenance information at the time of inspection of the brake 162 similarly to the above first embodiment.

F. Other Embodiment (F1) Each of the above embodiments has described the example where the maintenance information related to a result of maintenance executed with respect to both devices of the server 300 and the inspection device 200, and the history of the maintenance is used. By contrast with this, maintenance information related to the result of maintenance executed with respect at least one device of the server 300 and the inspection device 200, and a history of the maintenance may be used.

(F2) The above third embodiment has described the example of the inspection method including steps S122 and S172. By contrast with this, one of step S122 and S172 may not be provided, or both of step S122 and S172 may not be provided. In a case where step S122 is omitted, and in a case where the maintenance information includes information indicating that an abnormality of the server 300 has been detected at a time of maintenance (S120c: YES), the abnormality specifying unit 216 determines that the server 300 has an abnormality, and moves the processing to step S150. In a case where step S172 is omitted, and in a case where the maintenance information includes information indicating that an abnormality of the inspection device 200 has been detected at the time of maintenance (S170c: YES), the abnormality specifying unit 216 determines that the inspection device 200 has an abnormality, and moves the processing to step S150.

According to the inspection method configured in this way, in the abnormality specifying step, when the maintenance information includes the information indicating that the abnormality of the one device of the server 300 and the inspection device 200 has been detected at a time of the maintenance, the specifying step for specifying whether or not the device from which the abnormality has been detected has an abnormality is omitted, and then it is determined that the device from which the abnormality has been detected has the abnormality. Consequently, it is possible to simplify the abnormality specifying step by a simple method for checking whether or not there is an abnormality at the time of the maintenance.

(F3) Each of the above embodiments has described as the example where the inspection method for inspecting whether or not the running speed of the vehicle 100 and the brakes 162 of the vehicle 100 are appropriate. By contrast with this, the present disclosure is applicable to an inspection method for appropriately inspecting detection values of various detectors provided to the vehicle 100 such as an acceleration sensor, a sensor for detecting a state of charge of the battery 120, and a sensor for detecting a distance to an object outside the vehicle 100.

(F4) The above embodiments have described the examples where, in step S180, the plurality of vehicles 100 scheduled to be continuously inspected next to the inspection target vehicle 100 are used as the plurality of vehicles 100 different from the inspection target. By contrast with this, the plurality of arbitrarily extracted vehicles 100 that are not associated with the inspection schedule may be used.

(F5) Each of the above embodiments has described the example where the CPU 310 of the server 300 functions as the server control unit 312, the maintenance information acquisition unit 314, the vehicle speed acquisition unit 316, and the vehicle information acquisition unit 318. By contrast with this, all or part of the functions of the server control unit 312, the maintenance information acquisition unit 314, the vehicle speed acquisition unit 316, and the vehicle information acquisition unit 318 may be implemented by the CPU 212 of the inspection control device 210.

(F6) The above first embodiment has described the example where the subsequent inspection step is executed when the difference between the acquired inspection side speed and the target value is outside the second range in the normal vehicle 100 at the time of secondary inspection. By contrast with this, the subsequent inspection step may be omitted. In this case, step S140 may include a step of, when the difference between the acquired inspection side speed and the target value is within the second range in the normal vehicle 100, outputting that one of the inspection target and the inspection device 200 has an abnormality or that the server 300 has no abnormality.

(F7) The above first embodiment has described the example where, when that the inspection target has an abnormality, the inspection target is moved by remote control to a place where the inspection target can be repaired. By contrast with this, when the inspection target has an abnormality, another processing of broadcasting or the like for the administrator may be executed instead of or together with movement of the inspection target by remote control.

(F8) Each of the above embodiments has described the example where the vehicle 100 is a passenger car, a truck, a bus, a construction vehicle, or the like. In this regard, the vehicle 100 is not limited to these, and may include various cars, trains, and the like such as two-wheeled vehicles and four-wheel vehicles. Furthermore, the vehicle 100 may be various moving objects other than the vehicle 100. The "moving object" means an object that may move. The moving object includes, for example, an electric vertical takeoff and landing aircraft (so-called cars), ships, airplanes, robots, linear motorcars, and the like. In this case, expressions such as a "vehicle" and a "car" in the present disclosure can be replaced with a "moving object" as appropriate, and an expression "running" can be replaced with "movement" as appropriate. Furthermore, the inspection device 200 detects a moving operation of the moving unit that moves the moving object, and acquires the inspection side speed of the moving object instead of rotation of the wheels 160.

In each of the above-described embodiments, the vehicle 100 is simply required to have a configuration to become movable by unmanned driving. The vehicle 100 may embodied as a platform having the following configuration, for example. The vehicle 100 is simply required to include at least actuators and a controller. More specifically, in order to fulfill three functions including "run," "turn," and "stop" by unmanned driving, the actuators may include a control device (server) for controlling the run of the vehicle 100, a driving device, a steering device and a braking device. The actuators are controlled by the controller that controls running of the vehicle 100. In order for the vehicle 100 to acquire information from outside for unmanned driving, the vehicle 100 is simply required to include the communication device further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from a factory, or a remaining component such as a bodyshell may be mounted on the vehicle 100 after the vehicle 100 is shipped from a factory while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(F10) The example has been described where, according to the inspection method according to each of the above embodiments, in the abnormality specifying step, when the timing is within the predetermined period from the acquired execution timing of maintenance, secondary inspection and subsequent inspection are omitted, and the normal outputting step is executed. By contrast with this, irrespectively of the execution timing of maintenance, the secondary inspection and the subsequent inspection may be omitted on an occasion that maintenance is executed, and the normal outputting step may be executed on an occasion that maintenance is executed.

(F11) It has been described that, according to the inspection method according to the above third embodiment, the abnormality specifying step includes the abnormality outputting step of, when an abnormality of the one device of the server 300 and the inspection device 200 is detected at a time of the maintenance, outputting that the device from which the abnormality has been detected has the abnormality while omitting the secondary inspection and the subsequent inspection. By contrast with this, according to the inspection method that uses the trained model 226 as in the second embodiment, the specifying step may be omitted, and the abnormality outputting step may not be executed.

(F12) The example has been described where, according to the inspection method according to the above fourth embodiment, the abnormality specifying step includes the abnormality outputting step of, when an abnormality of the one device of the server 300 and the inspection device 200 is continuously or intermittently detected at a time of the maintenance, outputting that the device from which the abnormality has been detected has the abnormality while omitting the secondary inspection and the subsequent inspection. By contrast with this, according to the inspection method that uses the trained model 226 as in the second embodiment, the specifying step may be omitted, and the abnormality outputting step may not be executed.

(F13) In each of the above-described embodiments, the external sensor is not limited to the camera but may be the distance measuring device, for example. The distance measuring device is a light detection and ranging (LiDAR) device, for example. In this case, detection result output from the external sensor may be three-dimensional point cloud data representing the vehicle 100. The server 300 and the vehicle 100 may acquire the vehicle location information through template matching using the three-dimensional point cloud data as the detection result and reference point cloud data, for example.

(F14) In the above-described first embodiment, the server 300 automatically generates a running control signal to be transmitted to the vehicle 100. By contrast, the server 300 may generate a running control signal to be transmitted to the vehicle 100 in response to operation by an external operator existing outside the vehicle 100. For example, the external operator may operate an operating device including a display on which a captured image output from the external sensor is displayed, steering, an accelerator pedal, and a brake pedal for operating the vehicle 100 remotely, and a communication device for making communication with the server 300 through wire communication or wireless communication, for example, and the server 300 may generate a running control signal responsive to the operation on the operating device.

(F15) The vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(F16) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

The control unit and the control method described in the present disclosure may be implemented by a dedicated computer provided by configuring a processor programmed to execute one or a plurality of functions embodied by computer programs, and a memory. Alternatively, the control unit and the control method described in the present disclosure may be implemented by a dedicated computer provided by configuring a processor with one or more dedicated hardware logic circuits. Alternatively, the control unit and the control method described in the present disclosure may be implemented by one or more dedicated computers configured by a combination of a processor programmed to execute one or a plurality of functions, and a memory, and a processor configured by one or more hardware logic circuits. Furthermore, the computer programs may be stored as instructions executed by a computer in a computer-readable non-transitory recording medium.

The present disclosure is not limited to the above-described embodiments, and can be implemented by various configurations without departing from the gist of the present disclosure. For example, technical features in the embodiments corresponding to technical features in each aspect described in the summary can be replaced or combined as appropriate to solve part or all of the above-described problems or achieve part or all of the above-described effects. Furthermore, the technical features that are not described as indispensable in this description can be deleted as appropriate.

What is claimed is:

1. An inspection method for a moving object that can move by unmanned driving, the inspection method comprising:
    a first step of giving an instruction to perform driving from a server to a moving object of an inspection target such that an output value related to movement of the moving object is a predetermined target value;
    a second step of measuring the output value using an inspection device that inspects the moving object, and acquiring a measurement value;
    a maintenance information acquiring step of acquiring maintenance information related to a history of maintenance executed with respect to at least one target device of the server and the inspection device; and
    an abnormality specifying step of, when a difference between the target value and the measurement value is not within a predetermined reference range, specifying which one of the server, the inspection device, and the moving object of the inspection target has an abnormality using the maintenance information.

2. The inspection method according to claim 1, wherein the maintenance information is information related to an execution timing at which the maintenance has been executed with respect to the target device.

3. The inspection method according to claim 2, wherein, in the abnormality specifying step, when a timing at which the second step is executed is within a predetermined period from the execution timing included in the maintenance information, it is determined that the target device for which the maintenance has been executed has no abnormality.

4. The inspection method according to claim 1, further comprising a training step of training a machine learning model using past data related to input/output of the server, past data related to input/output of the inspection device, past data related to the maintenance information, and past data related to whether the server, the inspection device, and the moving object of the inspection target are normal or abnormal,
    wherein, in the abnormality specifying step, which one of the server, the inspection device, and the moving object of the inspection target has the abnormality is specified using the machine learning model trained in the training step.

5. The inspection method according to claim 4, wherein, in the abnormality specifying step, when the second step is executed within a predetermined period from an execution timing at which the maintenance has been executed with respect to the target device, information is output that indicates that a probability that the target device for which the maintenance has been executed has no abnormality is higher than a probability in a case where the maintenance is not executed.

6. The inspection method according to claim 1, wherein the maintenance information is information related to whether or not the abnormality of the target device has been detected at a time of the maintenance.

7. The inspection method according to claim 6, wherein, in the abnormality specifying step, when the maintenance information includes information indicating that the abnormality of the target device has been detected at the time of the maintenance, it is determined that the target device from which the abnormality has been detected has the abnormality.

8. The inspection method according to claim 6, wherein the abnormality specifying step executes a specifying step of, when the maintenance information includes information indicating that the abnormality of the target device has been detected at the time of the maintenance, and further includes information indicating that a member that has caused the abnormality of the target device from which the abnormality has been detected has been exchanged, determining that the target device from which the abnormality has been detected has no abnormality, or specifying whether or not the target device from which the abnormality has been detected has the abnormality.

9. The inspection method according to claim 1, wherein the maintenance information is information related to whether or not the abnormality of the target device has been continuously or intermittently detected at a time of the maintenance.

10. The inspection method according to claim 9, wherein, in the abnormality specifying step, when the maintenance information includes information indicating that the abnormality of the target device has been continuously or intermittently detected at a time of the maintenance, information is output that indicates that the target device from which the continuous or intermittent abnormality has been detected has the abnormality.

* * * * *